(12) United States Patent  (10) Patent No.: US 6,999,512 B2
Yoo et al.  (45) Date of Patent: Feb. 14, 2006

(54) TRANSCODING METHOD AND APPARATUS THEREFOR

(75) Inventors: Kook Yeol Yoo, Suwon (KR); Yoon Soo Kim, Seoul (KR); Jae Kyoon Kim, Daejeon (KR); Kwang Deok Seo, Daejeon (KR); Kyu Chan Roh, Daejeon (KR); Seong Cheol Heo, Daejeon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 902 days.

(21) Appl. No.: 09/864,385

(22) Filed: May 25, 2001

(65) Prior Publication Data

US 2002/0110193 A1   Aug. 15, 2002

(30) Foreign Application Priority Data

Dec. 8, 2000 (KR) .............................. 2000-74799

(51) Int. Cl.
 *H04B 1/66* (2006.01)
(52) U.S. Cl. .............................................. 375/240.03
(58) Field of Classification Search .......... 375/240.01, 375/240.02, 240.03, 240.08, 240.1, 240.12, 375/240.13; H04B 1/66
 See application file for complete search history.

(56) References Cited

U.S. PATENT DOCUMENTS 6,160,844 A * 12/2000 Wilkinson .................. 375/240

6,574,279 B1 * 6/2003 Vetro et al. ............ 375/240.08
6,647,061 B1 * 11/2003 Panusopone et al. .. 375/240.12

FOREIGN PATENT DOCUMENTS

EP   0 687 112 A2   12/1995

* cited by examiner

*Primary Examiner*—Tung Vo
(74) *Attorney, Agent, or Firm*—Sughrue Mion, PLLC

(57) ABSTRACT

A transcoding method and apparatus for converting a digital bitstream complying with a certain compression method into a digital bitstream complying with a different (or the same) compression method is provided. The transcoding apparatus performs conversion between compressed bitstreams having at least syntax elements and video elements corresponding to video data. The transcoding apparatus includes a decoder for reconstructing syntax elements and video elements from a first bitstream complying with a first compression method, an inverse quantizer for inverse-quantizing the video elements provided from the decoder according to the first compression method to reconstruct video data, a quantizer for requantizing the video data according to a second compression method, a syntax generator for mapping the syntax elements provided from the decoder to syntax elements complying with the second compression method, and an encoder for encoding the requantized video data (video elements complying with the second compression method) provided from the quantizer and the syntax elements provided from the syntax generator according to the second compression method, thereby outputting a second bitstream. The transcoding method facilitates the conversion between bitstreams complying with the same or different compression methods.

25 Claims, 14 Drawing Sheets

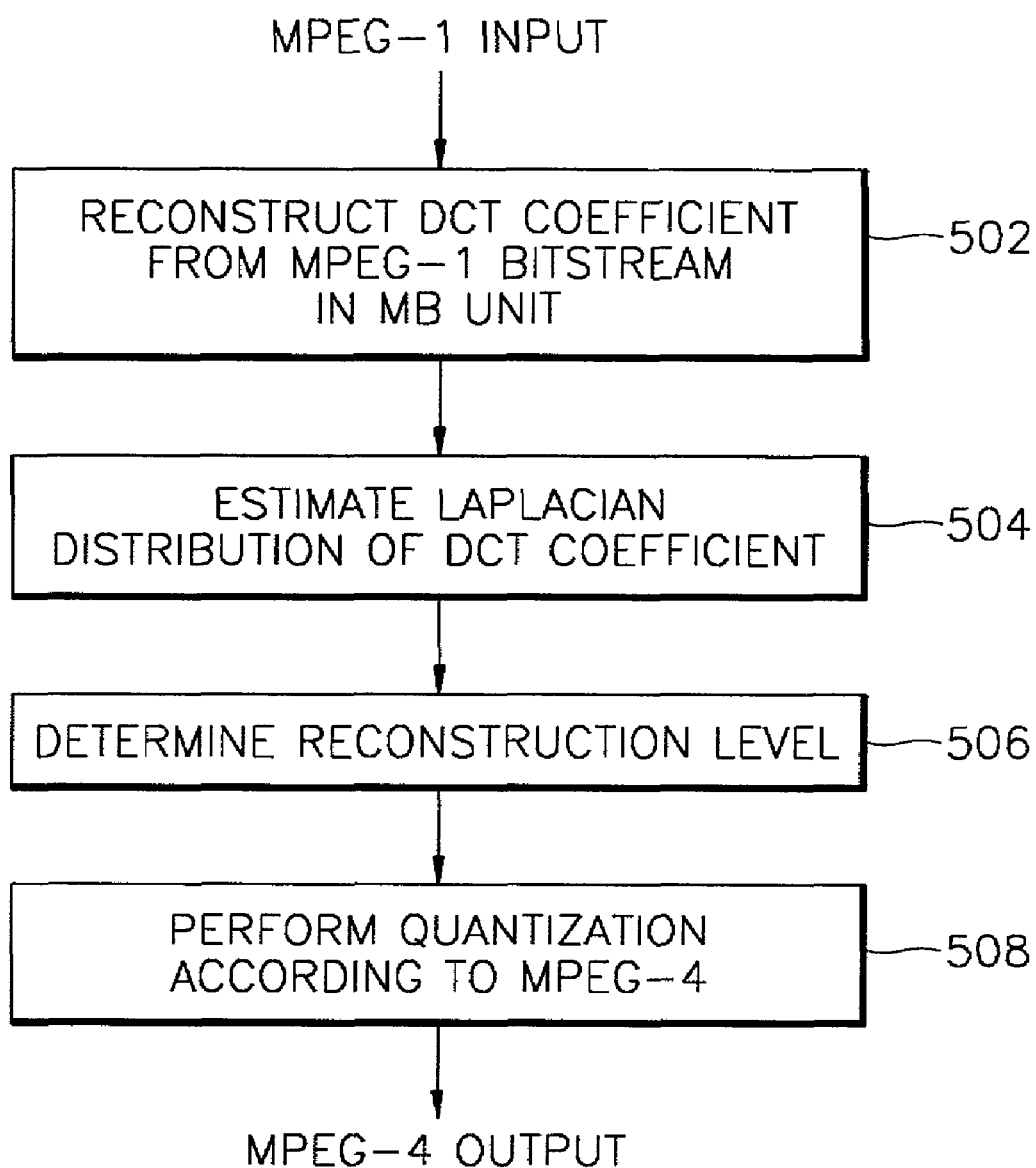

$$\begin{bmatrix} 8 & 16 & 19 & 22 & 26 & 27 & 29 & 34 \\ 16 & 16 & 22 & 24 & 27 & 29 & 34 & 37 \\ 19 & 22 & 26 & 27 & 29 & 34 & 34 & 38 \\ 22 & 22 & 26 & 27 & 29 & 34 & 37 & 40 \\ 22 & 26 & 27 & 29 & 32 & 35 & 40 & 48 \\ 26 & 27 & 29 & 32 & 35 & 40 & 48 & 58 \\ 26 & 27 & 29 & 34 & 38 & 46 & 56 & 69 \\ 27 & 29 & 35 & 38 & 46 & 56 & 69 & 83 \end{bmatrix}$$

TRANSCODING METHOD AND APPARATUS THEREFOR

BACKGROUND OF THE INVENTION

1. Field of the Invention

The present invention relates to a transcoding apparatus for converting a digital bitstream complying with a certain compression method into a digital bitstream complying with a different (or the same) compression method, and more particularly, to a transcoding method for converting a digital bitstream complying with a compression method performed using a quantizer without a dead zone into a digital bitstream complying with a compression method using a quantizer with the dead zone, and an apparatus therefor.

2. Description of the Related Art

The moving picture experts group (MPEG)-4 standard has been settled down as a compression method essential for the applications of recent Internet videos, mobile videos and smart media. Meanwhile, most existing digital video contents have been compressed according to the MPEG-1 standard, and the MPEG-2 standard was selected as a fundamental video compressing method for digital television broadcast (or high definition television (HDTV)). Therefore, it is highly expected that a large number of digital video contents are compressed according to the MPEG-2 standard. Accordingly, to provide a lot of digital video contents to a variety of terminals relating to digital videos afterwards, it will be important to converting digital video contents encoded according to the existing MPEG-1 or MPEG-2 standard into digital video contents complying with the MPEG-4 standard.

SUMMARY OF THE INVENTION

To solve the above problems, it is a first object of the present invention to provide a method of converting digital video contents compressed according to the moving picture experts group (MPEG)-1 standard or the MPEG-2 standard into digital video contents complying with the MPEG-4 standard.

It is a second object of the present invention to provide a method of converting a discrete cosine transform (DCT) coefficients quantized according to quantization without a dead zone into quantized DCT coefficients complying with quantization with the dead zone.

It is a third object of the present invention to provide an apparatus suitable for the above methods.

Accordingly, to achieve the first object of the invention, there is provided a transcoding method of performing conversion between compressed bitstreams having at least syntax elements and video elements corresponding to video data. The transcoding method includes the steps of a) decoding a first bitstream compressed according to a first compression method and parsing syntax elements and video elements; b) mapping the parsed syntax elements to syntax elements complying with a target second compression method; c) partially reconstructing video data complying with the first compression method from the parsed video elements; d) requantizing the video data reconstructed in the step c) according to the second compression method; and e) coding the mapped syntax elements and the requantized video data to obtain a bitstream complying with the second compression method.

To achieve the second object of the invention, there is provided a requantizing method in which an output y with respect to an input DCT coefficient x is expressed by $$y = Q_1(x) = \left\lfloor \left\lfloor \frac{x}{\Delta} + \frac{1}{2} \right\rfloor \cdot \Delta \right\rfloor,$$

a quantization step size $\Delta_i$ is given by $$\Delta i = \frac{Wi \cdot Q_p}{8}, i = 0, 1, 2 \ldots, 63$$

($Q_p$ is a quantization parameter), a decision level $t_m$ is given by $$t_m = \left(m - \frac{1}{2}\right) \cdot \Delta, \quad m \geq 1,$$

$x_m = \{x | x \in [t_m, t_{m+1}]\}$ when x belongs to a section $[t_m, t_{m+1}]$, an amplitude level $\lambda_m$ of $x_m$ is expressed by $$\lambda_m = \left\lfloor \frac{x_m}{\Delta} + \frac{1}{2} \right\rfloor,$$

an output x' with respect to the input DCT coefficient y, which has been quantized by a MPEG-1 quantizer having a dead zone in which a reconstruction level for $x_m$, that is, an inverse-quantized DCT coefficient $r_m$ is given by $r_m = \lfloor \lambda_m \cdot \Delta \rfloor$, is expressed by $$x' = Q_2(y) = \begin{cases} \left\lfloor \left\lfloor \frac{y}{\Delta'} \right\rfloor \cdot \Delta' + \frac{\Delta'}{2} \right\rfloor & \text{if } Q_p \text{ is odd} \\ \left\lfloor \left\lfloor \frac{y}{\Delta'} \right\rfloor \cdot \Delta' + \frac{\Delta'}{2} \right\rfloor - 1 & \text{if } Q_p \text{ is even} \end{cases},$$

a quantization step size $\Delta'$ is given by $\Delta' = 2Q_p$, a decision level $t'_n$ is given by $t'_n = n \cdot \Delta'$, $n \leq 1$, $y_n = \{y | y \in [t'_n, t'_{n+1}]\}$ when the output y belongs to a section $[t'_n, t'_{1+1}]$, and an amplitude level of $y_n$, that is, an inverse-quantized DCT coefficient $\lambda'_n$ is requantized by a MPEG-4 quantizer having a dead zone defined as $$\lambda'_n = \left\lfloor \frac{y_n}{\Delta'} \right\rfloor$$

and is converted into a MPEG-4 DCT coefficient. The requantizing method includes the steps of d-1) defining subscript values allowing the decision level to belong to a section $[t_m, t_{m+1}]$ as a set $p = \{p | t'_p \in [t_m, t_{m+1}]\}$; d-2) defining candidates of the subscript values of the decision level as a set K=P∪{min{P}−1} where the symbol ∪ indicates a union and an operator min{A} indicates a minimum value among the members of a set A; and d-3) selecting a member satisfying a cost function from among the candidate subscript values as a final subscript value, the cost function being expressed by $$k = arg\min_{k \in K} |C_m - r'_k| \text{ where } C_m = \frac{\int_{t_m}^{t_{m+1}} x \cdot p(x) dx}{\int_{t_m}^{t_{m+1}} p(x) dx}$$

where $C_m$ is an optimum reconstruction level in the section $[t_m, t_{m+1}]$ used by a Lloyd-Max quantizer in view of mean square error, and p(x) is a Laplacian distribution function.

To achieve the third object of the invention, there is provided a transcoding apparatus of performing conversion between compressed bitstreams having at least syntax elements and video elements corresponding to video data. The transcoding apparatus includes a decoder for reconstructing syntax elements and video elements from a first bitstream complying with a first compression method; an inverse quantizer for inverse-quantizing the video elements provided from the decoder according to the first compression method to reconstruct video data; a quantizer for requantizing the video data according to a second compression method; a syntax generator for mapping the syntax elements provided from the decoder to syntax elements complying with the second compression method; and an encoder for encoding the requantized video data (video elements complying with the second compression method) provided from the quantizer and the syntax elements provided from the syntax generator according to the second compression method, thereby outputting a second bitstream.

BRIEF DESCRIPTION OF THE DRAWINGS

The above objectives and advantages of the present invention will become more apparent by describing in detail preferred embodiments thereof with reference to the attached drawings in which:

FIG. 5 is a flowchart illustrating a method of requatizing DCT coefficients according to the present invention;

DETAILED DESCRIPTION OF THE PRESENT INVENTION

Figure 1:
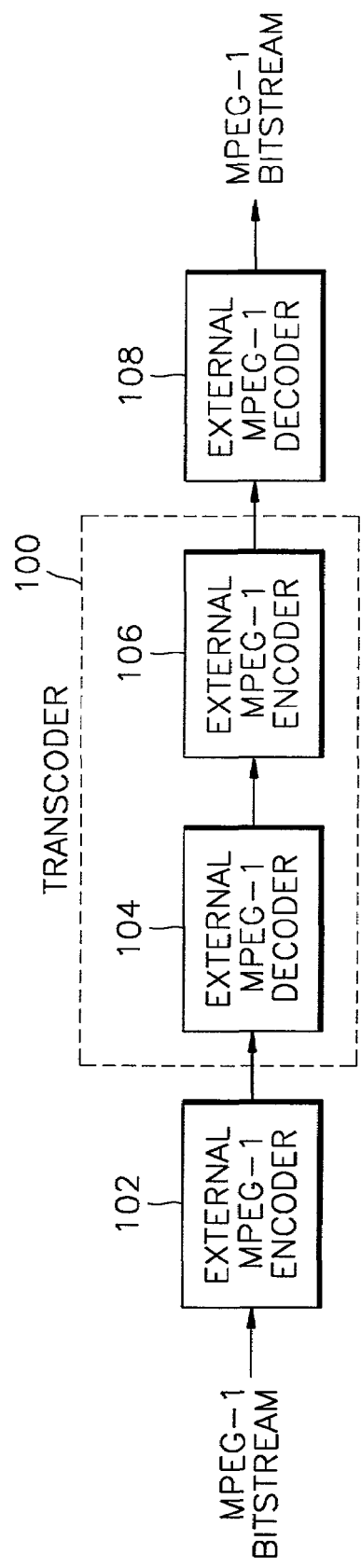
FIG. 1 is a diagram illustrating the concept of a transcoding apparatus which is applied to moving picture experts group (MPEG)-1 compression.

FIG. 1 illustrates the example of a transcoding apparatus applied to moving picture experts group (MPEG)-1 compression. The transcoding apparatus of FIG. 1 converts an input MPEG-1 bitstream into a MPEG-1 bit stream having a different aspect ratio or a different bit rate. Here, the MPEG-1 bitstream indicates a digital video bitstream which has been compressed according to MPEG-1 compression.

A transcoder 100 includes an internal MPEG-1 decoder 104 and an internal MPEG-1 encoder 106. The internal MPEG-1 decoder 104 decodes a MPEG-1 bitstream provided from an external MPEG-1 encoder 102 to form video data. The internal MPEG-1 encoder 106 encodes the video data reconstructed by the internal MPEG-1 decoder 104 to form a MPEG-1 bitstream having a different aspect ratio or a different bit rate. An external MPEG-1 decoder 108 decodes the MPEG-1 bitstream output from the internal MPEG-1 encoder 106 to form video data. Due to the operation of the transcoder 100, the aspect ratio and the bit rate of a MPEG-1 bitstream input to the transcoder 100 are different from those of a MPEG-1 bitstream output therefrom.

The external MPEG-1 encoder 102 may be installed in a program provider party such as a video-on-demand (VoD) service provider, and the external MPEG-1 decoder 108 may be installed in a receiving party provided with programs by the VoD service provider. In other words, the transcoder 100 converts bitstreams provided by a program provider into bitstreams having a bit rate and an aspect ratio suitable for a display unit provided in a receiving party.

Figure 2:
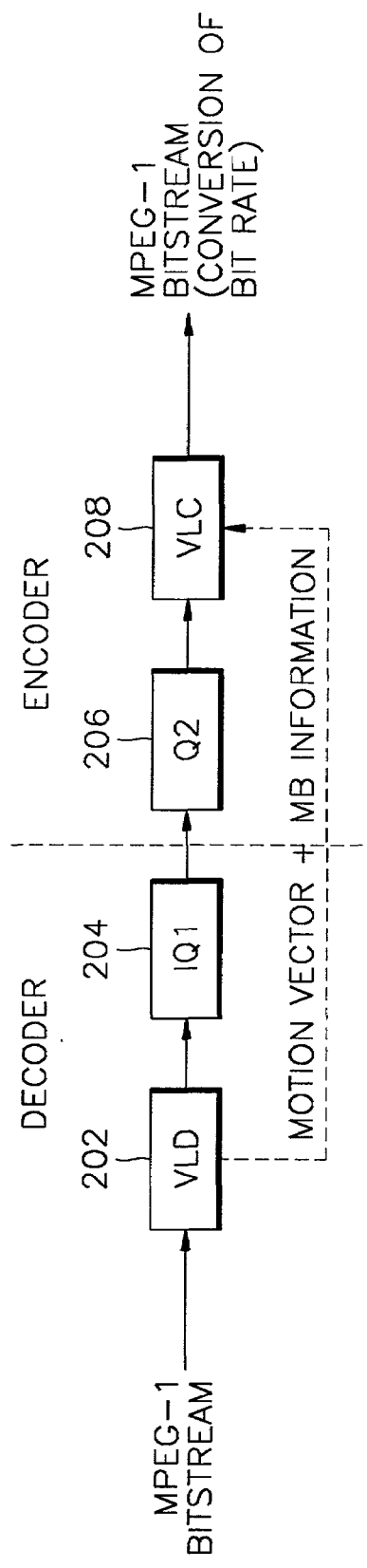
FIGS. 2 and 3 are diagrams illustrating conventional embodiments of the transcoding apparatus of FIG. 1.
Figure 3:
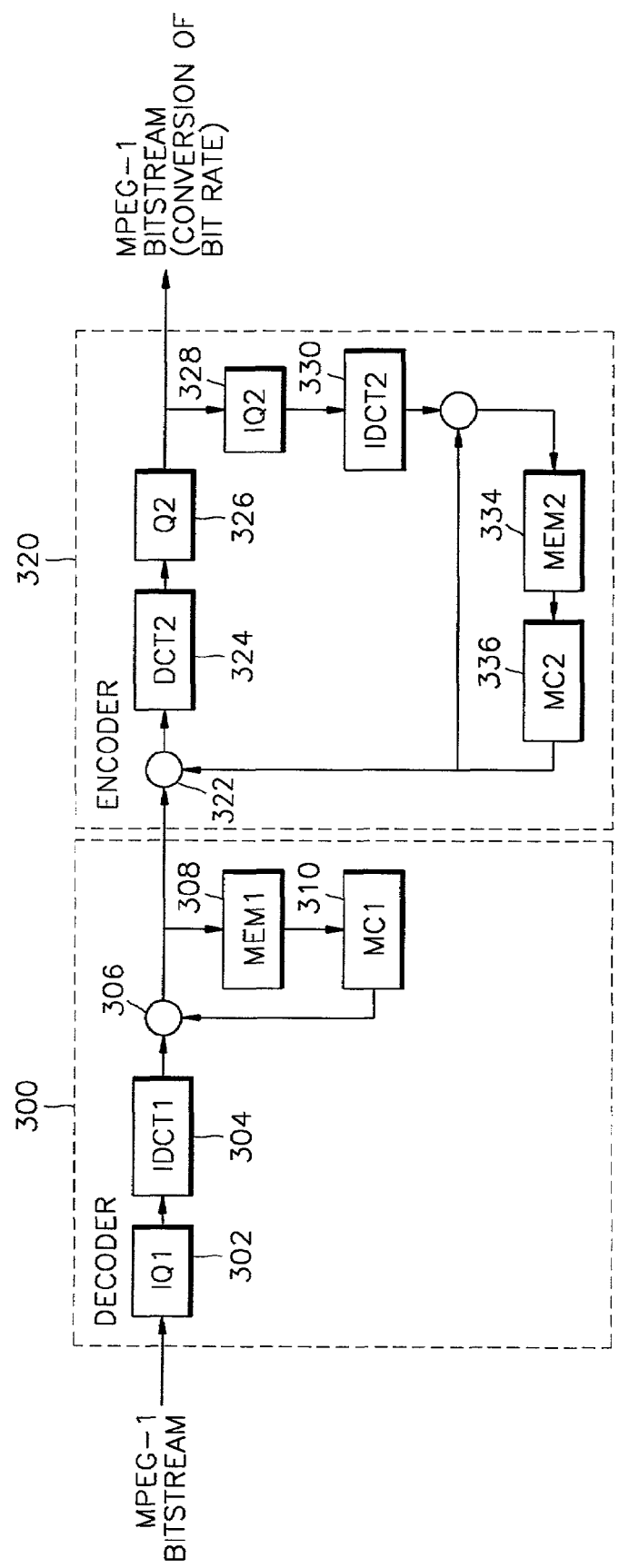

FIGS. 2 and 3 are diagrams illustrating conventional embodiments of the transcoding apparatus of FIG. 1. FIGS. 2 and 3 illustrates an open loop transcoder and a closed loop transcoder, respectively. Here, the open loop transcoder reconstruct only a portion, for example, a macroblock (MB), of video data from a bitstream. On the other hand, the closed loop transcoder reconstructs entire video data from a bitstream and encodes the video data. In MPEG compression, a MB is typically composed of 4 luminance blocks and 2 color difference blocks.

Since input and output bitstreams are compressed by the same method or have the same syntax, the explanation of the operations of the apparatus of FIGS. 2 and 3 is restricted to conversion of video elements, in particular, to conversion of MBs. Each MB includes a discrete cosine transform (DCT) coefficient encoded according to a variable length coding method, a motion vector and MB information.

The open loop transcoder of FIG. 2 performs conversion in MB units. The motion vector and the MB information of each MB are separated from the MB before conversion and are united to the MB after the conversion. The DCT coefficient of the MB is decoded by a variable length decoder (VLD) 202 and then inverse-quantized by an inverse quantizer (IQ1) 204. The IQ1 204 recovers a DCT coefficient of each DCT block. A quantizer (Q2) 206 quantizes the DCT coefficient of each DCT block recovered by the IQ1 204 to be suitable for a set bit rate. A variable length coder (VLC) 208 variable length codes the DCT coefficient quantized by the Q2 206. A DCT coefficient output from the VLC 208 is united with the motion vector and the MB information which have been separated before conversion.

The apparatus of FIG. 3 reconstructs entire video data from a MPEG-1 bitstream and re-encodes the video data to have a desired aspect ratio and bit rate. A decoder 300 reconstructs video data from an input MPEG-1 bitstream. The reconstructed video data is re-encoded by an encoder 320. A bitstream corresponding to a desired aspect ratio and bit rate can be obtained due to the operation of the encoder 320. The decoder 300 is a typical MPEG-1 decoder and includes an inverse quantizer (IQ1) 302, an inverse DCT converter (IDCT1) 304, an adder 306, a memory (MEM1) 308 and a motion compensator (MC1) 310. The encoder 320 is a typical MPEG-1 encoder and includes a subtractor 322, a DCT converter (DCT2) 324, a quantizer (Q2) 326, an inverse quantizer (IQ2) 328, an inverse DCT converter (IDCT2) 330, a subtractor 332, a memory (MEM2) 334 and a motion compensator (MC2) 336.

An open loop transcoder as shown in FIG. 2 demonstrates the excellent performance with a very small complexity when a video coding method is an intra-picture (I-picture) coding method. However, when a video coding method is an inter-picture (P-picture or B-picture) coding method, the open loop transcoder has problems in that a reference image changes due to a quantization error changing during motion compensation, resulting in the accumulation of errors (referred to as a drift). Consequently, a picture quality is degraded.

A closed loop transcoder as shown in FIG. 3 is faithful to the concept illustrated in FIG. 1. An entire bitstream is decoded to reconstruct video data (by the decoder 300), and then the video data is re-encoded to generate a bitstream having a desired format (by the encoder 320). Such a closed loop transcoder has an advantage of stably generating a bitstreams of a desired bit rate, but has disadvantages of a large complexity of the apparatus and a large amount of calculation.

In addition, the transcoders of FIGS. 2 and 3 perform a conversion between the same encoding methods so that they cannot be applied to MPEG-4 terminals which are essential to a variety of multimedia communications and storage relating to Internet videos, mobile networks, smart media and the like.

To overcome these problems, the present invention provides an apparatus and method for converting a bitstream generated according to the MPEG-1 or MPEG-2 standard into a bitstream generated according to the MPEG-4 standard. In addition, the present invention provides an optimum requantization method for maintaining an image quality of much as possible during requantization of a DCT coefficient.

Transcoding according to the present invention is performed as follows.

a) An input MPEG-1 (or MPEG-2) bitstream is variable length decoded, and a MPEG-1 (or MPEG-2) syntax element and a DCT coefficient is parsed and extracted from the input bitstream. In this specification, description of this process is restricted to a video syntax element and DCT coefficient.

b) The extracted MPEG-1 (or MPEG-2) syntax element is mapped to be suitable for the MPEG-4 standard.

c) The extracted DCT coefficient is inverse-quantized according to the MPEG-1 (or MPEG-2) standard.

d) An inverse-quantized DCT coefficient is requantized according to the MPEG-4 standard to meet a desired bit rate. A bit rate is set during this requantization.

e) The syntax element mapped to comply with the MPEG-4 standard and the DCT coefficient requantized according to the MPEG4 standard are variable length coded, thereby obtaining a bitstream complying with the MPEG-4 standard.

Figure 4:
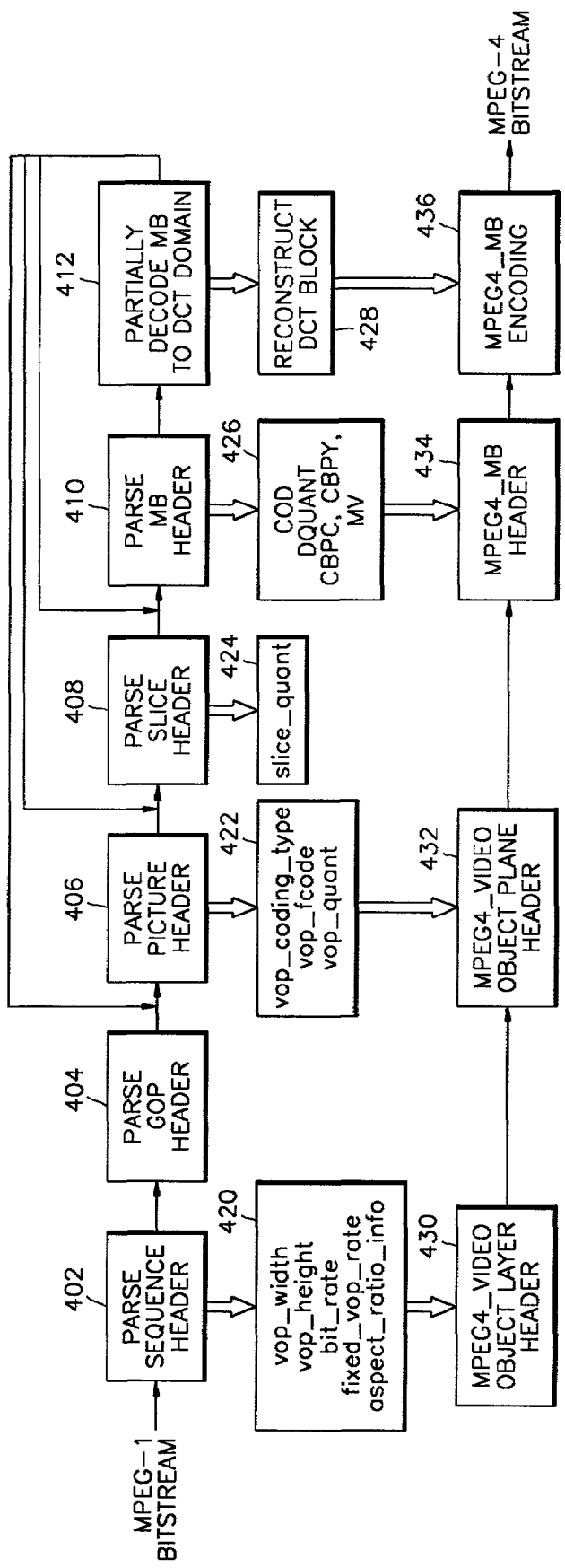
FIG. 4 is a diagram illustrating the processes of a transcoding method according to the present invention, through which a MPEG-1 bitstream is converted into a MPEG-4 bitstream.

FIG. 4 is a diagram illustrating the processes of a transcoding method according to the present invention, through which a MPEG-1 bitstream is converted into a MPEG-4 bitstream. In FIG. 4, the first row shows detailed processes for the parsing of MPEG-1 syntax elements and processes of inverse-quantizing a DCT coefficient. The second row shows processes of mapping the MPEG-1 syntax elements to MPEG-4 syntax elements. The third row shows processes of forming a MPEG-4 bitstream from the MPEG-4 syntax elements and a quantized DCT coefficient obtained through requantization.

In step 402, a sequence header is parsed. In step 404, a group of picture (GOP) header is parsed. In step 406, a picture header is parsed. In step 408, a slice header is parsed. In step 410, a MB header is parsed. In the steps 402 through 410, the sequence header, the GOP header, the picture header, the slice header and the MB header are sequentially separated from an input MPEG-1 bitstream. In the MPEG-1 (MPEG-2) standard, an image has a layer structure composed of a DCT block, a MB, a slice, a picture and a GOP in the ascending order of size. In step 412 of converting an MB to a DCT, a DCT coefficient is reconstructed in MB unit.

In an object layer syntax element mapping step 420, the syntax elements of a MPEG-1 sequence layer are mapped to syntax elements vop_width, vop_height, bit_rate, fixed_vop_rate and aspect_ratio_info of a MPEG-4 sequence layer based on information contained in the parsed MPEG-1 sequence header obtained by performing the step 402. In an object plane syntax element mapping step 422, the syntax elements of a MPEG-1 object plane layer are mapped to syntax elements vop_coding_type, vop_fcode and vop_quant of a MPEG-4 object plane layer based on information contained in the parsed MPEG-1 picture header obtained by performing the step 406. In a slice layer element mapping step 424, the syntax element of a MPEG-1 slice layer is mapped to a syntax element slice$_{quant}$ of a MPEG-4 slice layer based on information contained in the parsed MPEG-1 slice header obtained by performing the step 408. In a MB layer element mapping step 426, the syntax elements of a MPEG-1 MB layer are mapped to syntax elements COD, DQUANT, CBPC, CBPY and MV of a MPEG-4 MB layer based on information contained in the parsed MB header obtained by performing the step 410. In a requantization step 428, the DCT coefficient of the MPEG-1 standard, which is obtained by performing the step 412, is requantized according to the MPEG-4 standard.

In an object header generating step 430, an object header including the MPEG-4 object layer syntax elements vop_width, vop_height, bit_rate, fixed_vop rate and aspect_ratio_info obtained through the step 420 is generated. In an object plane header generating step 432, an object plane header including the MPEG-4 object plane syntax elements vop_coding_type, vop_fcode and vop_quant obtained through the step 422 is generated. In a MB header generating step 434, a MB header including the MPEG-4 MB layer syntax elements COD, DQUANT, CBPC, CBPY and MV obtained through the step 426 is generated. In an encoding step 436, the requantized DCT coefficient obtained through the step 428, the object header generated in the step 430, the object plane header generated in the step 432 and the MB header generated in the step 434 are united and variable length coded thereby generating a MPEG-4 bitstream.

In the present invention, a procedure of mapping MPEG-1 (or MPEG-2) syntax elements to MPEG-4 syntax elements is as follows.

b-1) Since a syntax element f_code (indicating the motion range of a motion vector) in MPEG-1 has a different meaning from that in MPEG-4, the MPEG-1 f_code is converted into a MPEG-4 f_code. In Table 1, the motion ranges indicated by motion vectors and codes in MPEG-1 and MPEG-4 are compared.

TABLE 1

| MPEG-4 | | MPEG-1 | |
|---|---|---|---|
| vop_f_code_forward | Motion range | forward_f_code | Motion range |
| 1 | [−32, 31] | 1 | [−16, 15] |
| 2 | [−64, 63] | 2 | [−32, 31] |
| 3 | [−128, 127] | 3 | [−64, 63] |
| 4 | [−256, 255] | 4 | [−128, 127] |
| 5 | [−512, 511] | 5 | [−256, 255] |
| 6 | [−1024, 1023] | 6 | [−512, 511] |
| 7 | [−2048, 2047] | 7 | [−1024, 1023] |

As shown in Table 1, in the same motion range, the value of the MPEG-4 vop_f_code forward is smaller than the value of the MPEG-1 forward_f_code by 1. In addition, a motion range corresponding to the minimum value 1 of the MPEG-4 vop_f_code_forward covers a motion range corresponding to the minimum value 1 of the MPEG-1 forward_f_code. This can be expressed by Equation (1).

$$vop\_f\_code\_forward = \max((forward\_f\_code-1), 1) \quad (1)$$

where max(a, b) is an operator of selecting a larger value between a and b.

b-2) A MPEG-1 MB type is converted into a MPEG-4 MB type.

Table 2 compares the MB types between the MPEG-1 standard and the MPEG-4 standard.

As shown in Table 2, there are 6 MB types except "stuffing" and "inter+4v" in MPEG-4, and there are 8 MB types in MPEG-1.

The three MB types "nomc+coded", "nomc+coded+q" and "mc+not coded" among the MB types in MPEG-1 do not exist in MPEG-4. To realize these properties, conversion is performed according to the following rules.

(i) The MB type "nomc+coded" is set as the "inter" type of MPEG-4, and then a motion vector is set to (0, 0).

(ii) The MB type "nomc+coded+q" is set as the "inter+q" type of MPEG-4, and then a motion vector is set to (0, 0).

(iii) The MB type "mc+not coded" is set as the "inter" type of MPEG-4. A motion vector is used as it is. The values of "cbpy" and "cbpc" are set to zero.

(iv) For skipped MBs, the value of "code" determining "not coded" in MPEG-4 is set to 0 such as "cod=0" as many times as the skipped MBs.

b-3) A MPEG-1 CBP is converted into MPEG-4 CBP.

Two kinds of information cbpy (coded block pattern of Y where Y is a luminance signal) and cbpc (coded block pattern of C where C is a color signal) in MPEG-4 are united in one syntax element cbp in MPEG-1. The syntax element cbp in MPEG-1 indicates the existence/non-existence of a DCT block including a non-zero DCT coefficient for the DCT blocks included in a MB, and has as many bits as the DCT blocks included in the MB. Each bit indicates whether there is any non-zero DCT coefficient in a corresponding DCT block. Typically, a MB is composed of 4 luminance DCT blocks and 2 color difference DCT blocks so that the syntax element cbp is represented with 6 bits.

The syntax element cbpy in MPEG-4 corresponds to bits (4 bits) corresponding to the luminance DCT blocks in the MPEG-1 cbp, and the syntax element cbpc in MPEG-4 corresponds to bits (2 bits) corresponding to the color difference DCT blocks in the MPEG-1 cbp.

The syntax element cbpy is individually coded, and this can be expressed by Equation (2).

$$cbpy = (cbp \& 0x03c) >> 2 \quad (2)$$

| | MPEG-4 | | | | | | | | MPEG-1 | | | | | |
|---|---|---|---|---|---|---|---|---|---|---|---|---|---|---|
| VOP type | MB type | Name | Not coded | mcbpc | cbpy | dquant | mvd | mvd2–4 | Picture type | MB type | MB quant | MB motion forward | MB motion backward | MB motion pattern | MB intra |
| P | Not coded | — | 1 | | | | | | I | intra | 0 | 0 | 0 | 0 | 1 |
| P | 0 | inter | 1 | 1 | 1 | 1 | 1 | | I | intra + q | 1 | 0 | 0 | 0 | 1 |
| P | 1 | inter + q | 1 | 1 | 1 | | 1 | | P | MC + coded | 0 | 1 | 0 | 1 | 0 |
| P | 2 | inter + 4 V | 1 | 1 | 1 | | 1 | 1 | P | nomc + coded | 0 | 0 | 0 | 1 | 0 |
| P | 3 | intra | 1 | 1 | 1 | | | | P | mc + not coded | 0 | 1 | 0 | 0 | 0 |
| P | 4 | intra + q | 1 | 1 | 1 | | | | P | intra | 0 | 0 | 0 | 0 | 1 |
| P | stuffing | — | 1 | 1 | | | | | P | mc + coded + q | 1 | 1 | 0 | 1 | 0 |
| I | 3 | intra | | 1 | 1 | | | | P | nomc + coded + q | 1 | 0 | 0 | 1 | 0 |
| | | | | | | | | | P | intra + q | 1 | 0 | 0 | 0 | 1 | where "&" indicates an AND operation performed in bit unit, "0x3c" indicates "3c" of a hexadecimal number, and ">>n" indicates an n-bit right shift operation.

The syntax element cbpc can be expressed by Equation (3).

$$cbpc = (cbp \& 0x03) >> 2 \quad (3)$$

The syntax element cbpc is united with the MB type obtained in the above step (b-2) and coded to comply with the mcbpc VLC table of corresponding MPEG-4 I-VOP and P-VOP.

b-4) The value of a MPEG-1 MQUANT is converted into a value of a MPEG-4 DQUANT.

The value of the MPEG-4 DQUANT is the difference between adjacent MBs in a quantization parameter (QUANT). QUANT values exist in the range of [1, 31] and should satisfy a relation, $|Q_n - Q_{n-1}| \leq 2$. Converting a MPEG-1 MQUANT value into a MPEG-4 DQUANT value can be expressed by Equation (4).

$$dquant = \min(\max((mquant\ of\ current\ MB - mquant\ of\ previous\ MB), -2), 2) \quad (4)$$

where "mquant" indicates a MPEG-1 quantization parameter.

When fully reflecting the range of a current mquant to ensure accuracy much more, a resynchronization maker according to the MPEG-4 standard can be used.

In MPEG-1 and MPEG-4, a quantization step size varies with a quantization weight as well as a quantization parameter. Usually, a MPEG-1 quantization step size $\Delta$ is always larger than a MPEG-4 quantization step size $\Delta'$. Accordingly, when requantizing a DCT coefficient reconstructed from a MPEG-1 bitstream according to the MPEG-4 standard, disagreement between MPEG-1 and MPEG-4 in a quantization size should be appropriately handled to maximize the quality of an image reconstructed from a converted MPEG-4 bitstream.

FIG. 5 is a flowchart illustrating a method of requatizing DCT coefficients according to the present invention. A procedure of requantizing a DCT coefficient in a transcoding method according to the present invention will be described with reference to FIG. 5. In step 502, a DCT coefficient is reconstructed from a MPEG-1 bitstream in MB unit. In step 504, the Laplacian distribution of the DCT coefficient is estimated. In step 506, a reconstruction level is determined using the estimated Laplacian distribution characteristics of the DCT coefficient. In step 508, quantization is performed according to MPEG-4 using the determined reconstruction level.

Figures 6A, 6B:
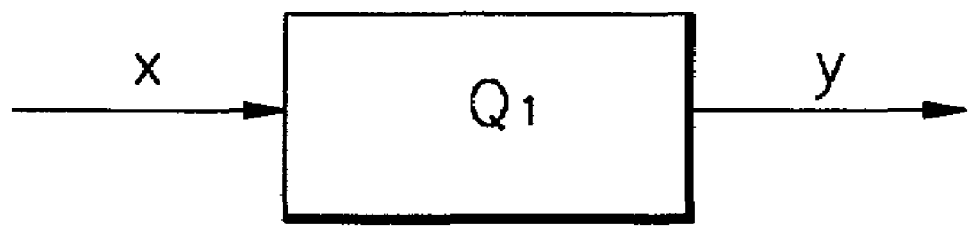
FIGS. 6A through 6E are diagrams for explaining the concept of quantization according to the present invention.

FIGS. 6A through 6E are diagrams for explaining the concept of quantization according to the present invention. FIG. 6A illustrates a MPEG-1 quantizer. FIG. 6B illustrates quantization weighting factors Wi of a fundamental quantization table for a luminance component used in quantizing an intra MB. Based on the quantization weighting factors of the quantization table, a quantization step size is determined as follows.

$$\Delta i = \frac{Wi \cdot Q_p}{8}, i = 0, 1, 2 \cdots, 63 \quad (5)$$

where $Q_p$ is a quantization parameter.

In FIG. 6A, the relation between the input x and output y of the quantizer with respect to an arbitrary DCT coefficient can be expressed as follows.

$$y = Q_1(x) = \left\lfloor \left\lfloor \frac{x}{\Delta} + \frac{1}{2} \right\rfloor \cdot \Delta \right\rfloor \quad (6)$$

where an operator $\lfloor a \rfloor$ indicates an integer most approximate to "a".

A decision level $t_m$ is given by Equation (7).

$$t_m = \left(m - \frac{1}{2}\right) \cdot \Delta, \quad m \geq 1 \quad (7)$$

When x belongs to a range $[t_m, t_{m+1}]$, $x_m = \{x | x \in [t_m, t_{m+1}]\}$. An amplitude level $\lambda_m$ of $x_m$ is given by Equation (8).

$$\lambda_m = \left\lfloor \frac{x_m}{\Delta} + \frac{1}{2} \right\rfloor \quad (8)$$

From Equations (8) and (6), $x_m$ is mapped to an m-th reconstruction level according to Equation (9).

$$r_m = \lfloor \lambda_m \cdot \Delta \rfloor \quad (9)$$

An input x having a negative value has the following quantization mapping relation.

$$y = -Q_1(|x|) \quad (10)$$

Figure 6C:
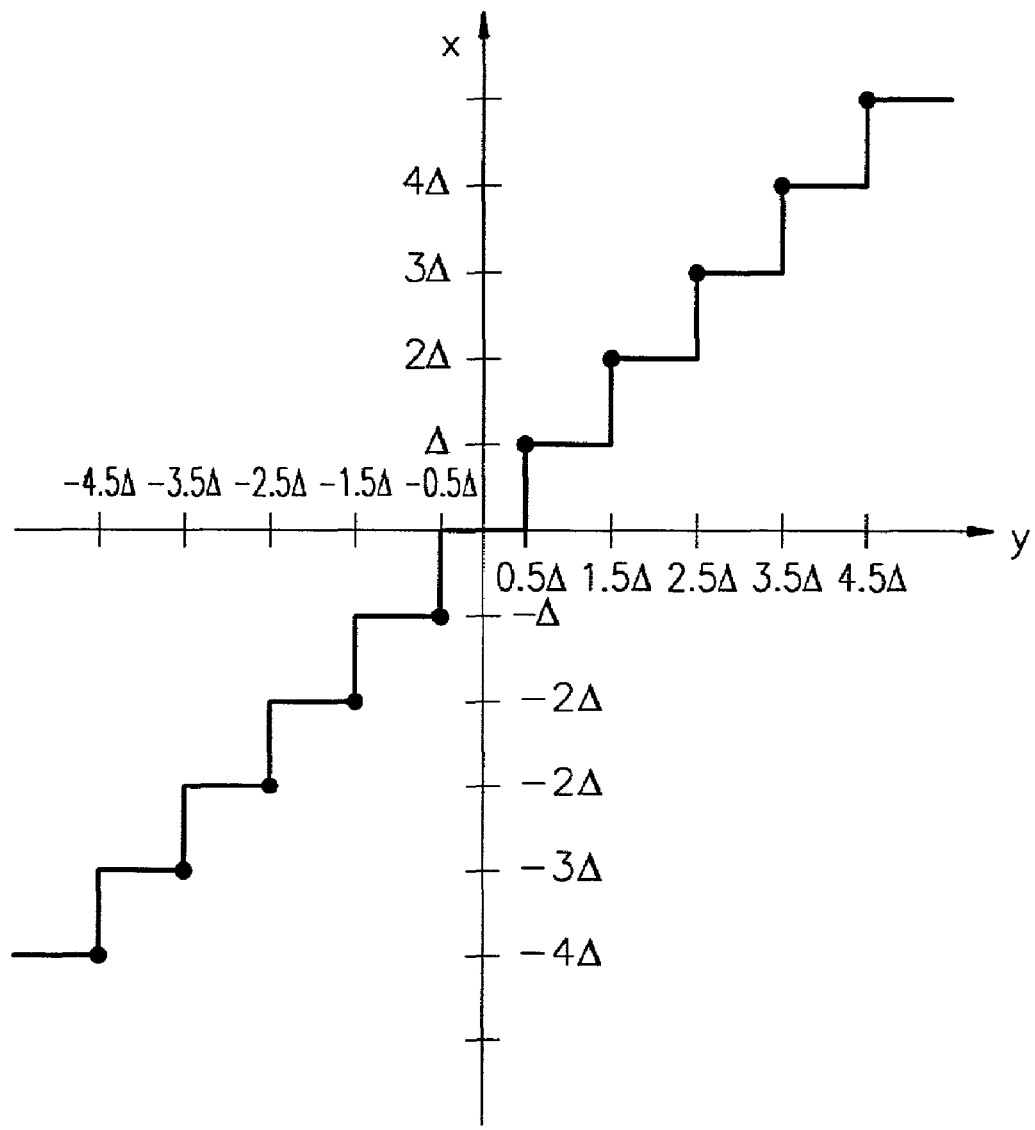

FIG. 6C illustrates the quantizer characteristics for a MPEG-1 intra MB. In FIG. 6C, a unit on the vertical and horizontal axes "x" and "y" is a quantization step size, $\Delta$. Here, a MPEG-1 quantizer is a uniform quantizer and does not have a dead zone. In other words, the length of a section including the origin is the same as that of any other section on the vertical axis.

Figure 6D:
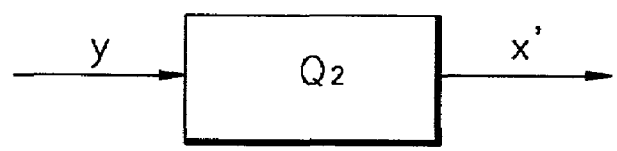

FIG. 6D illustrates a MPEG-4 quantizer. The output x' of the MPEG-4 quantizer with respect to an input y is given by Equation (11).

$$x' = Q_2(y) = \begin{cases} \left\lfloor \left\lfloor \frac{y}{\Delta'} \right\rfloor \cdot \Delta' + \frac{\Delta'}{2} \right\rfloor & \text{if } Q_p \text{ is odd} \\ \left\lfloor \left\lfloor \frac{y}{\Delta'} \right\rfloor \cdot \Delta' + \frac{\Delta'}{2} \right\rfloor - 1 & \text{if } Q_p \text{ is even} \end{cases} \quad (11)$$

A quantization step size $\Delta'$ is given by Equation (12).

$$\Delta' = 2Q_p \quad (12)$$

where $Q_p$ is a quantization parameter.

A decision level $t'_n$ is given by Equation (13).

$$t'_n = n \cdot \Delta', n \geq 1 \quad (13)$$

When the output y belongs to a range $[t'_n, t'_{n+1}]$, $y_n = \{y | y \in [t'_n, t'_{n+1}]\}$. An amplitude level $\lambda'_n$ of $y_n$ is given by Equation (14).

$$\lambda'_n = \left\lfloor \frac{y_n}{\Delta'} \right\rfloor \quad (14)$$

Figure 6E:
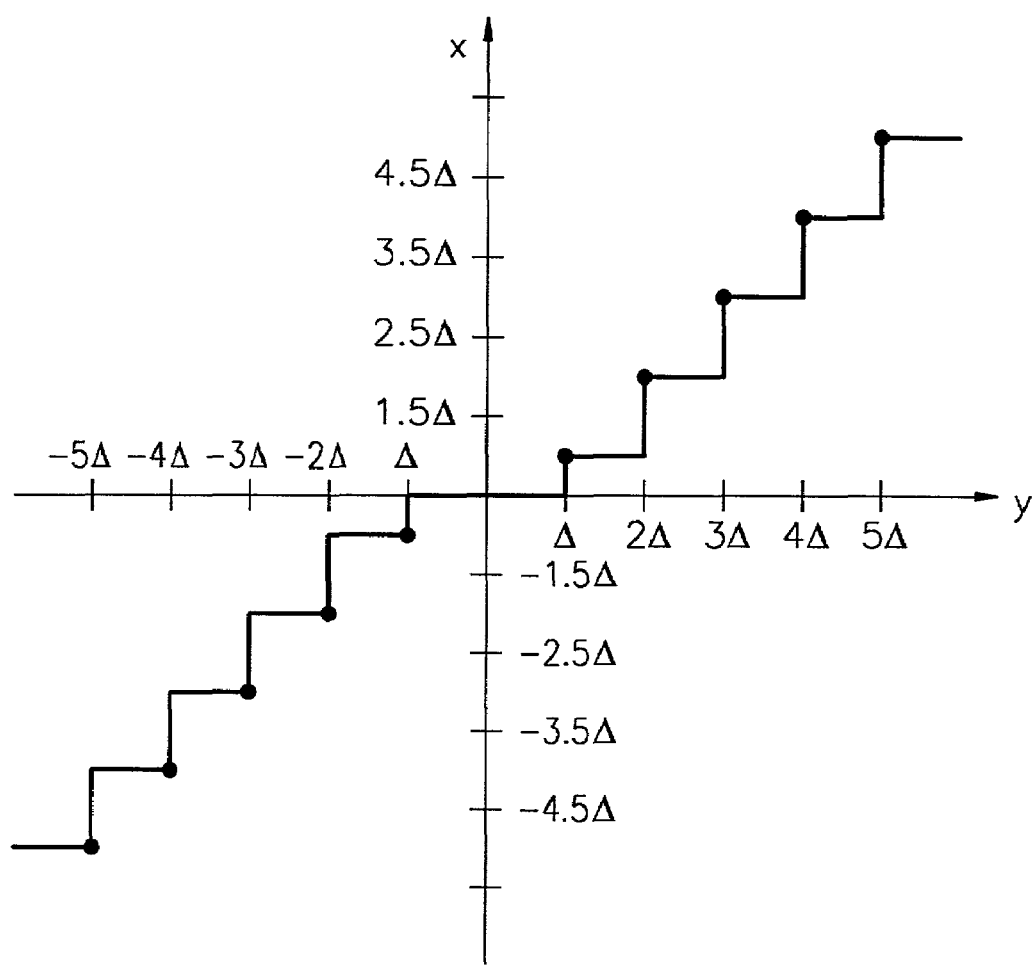

The characteristics of the MPEG-4 quantizer are shown in FIG. 6E. In FIG. 6E, the existence of a dead zone is confirmed. In other words, the length of a section including the origin is different from that of any other section on the vertical axis.

In Equation (5), a MPEG-1 quantization step size $\Delta$ is weighted with a quantization table value Wi in addition to a quantization parameter $Q_p$. On the other hand, in the case of MPEG-4, the quantization parameter $Q_p$ is doubled according to Equation (12), and the resultant value is set as a quantization step size $\Delta'$.

Accordingly, except the case where the quantization table value Wi is 16, a MPEG-1 quantization step size $\Delta$ is always larger than a MPEG-4 quantization step size $\Delta'$. Referring to FIG. 6B, only when a quantization index i is 1, 8 or 9, a MPEG-1 quantization step size is the same as a MPEG-4 quantization step size. Although a MPEG-1 quantization step size is the same as a MPEG-4 quantization step size when a quantization index i is 1, 8 or 9, the dead zone of the quantizer Q1 is not the same as that of the quantizer Q2, as shown in FIGS. 6C and 6E, so that it can be appreciated that the two quantizers have different characteristics.

Figure 7A:
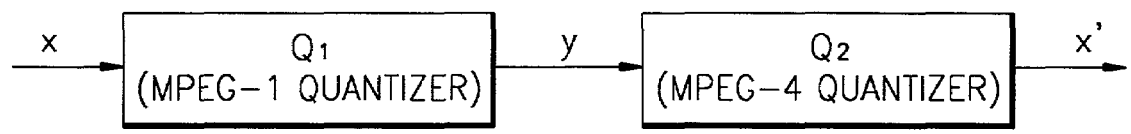
FIGS. 7A and 7B are diagrams for explaining requantization according to the present invention.
Figure 7B:
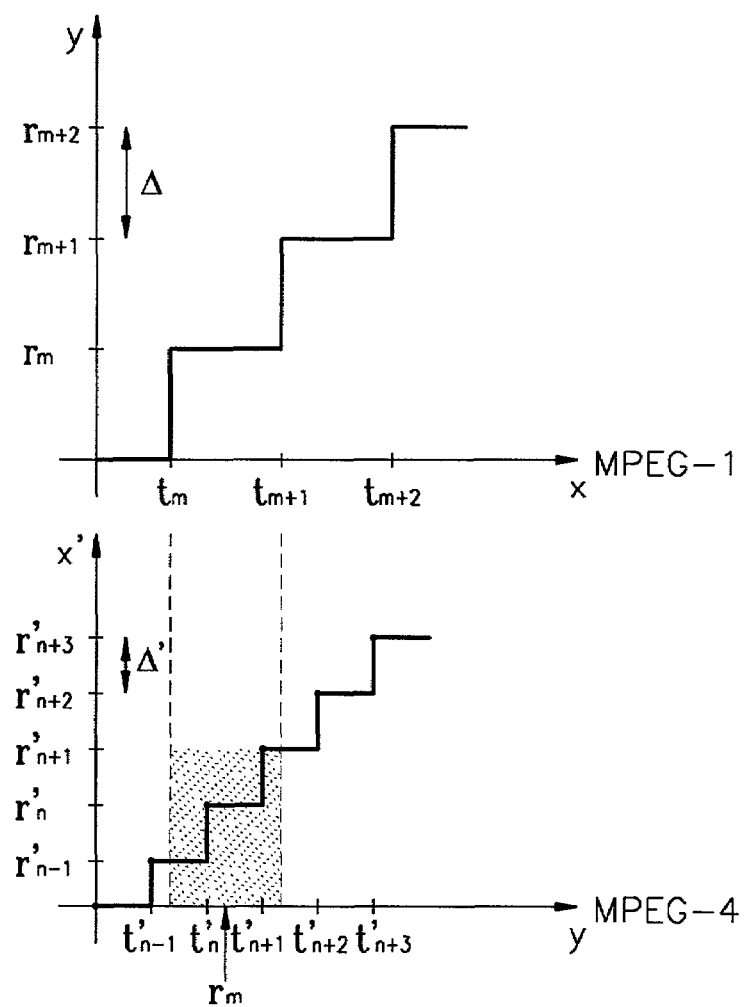

FIGS. 7A and 7B are diagrams for explaining requantization according to the present invention. FIG. 7A illustrates a consecutive quantization structure in which the quantizers Q1 and Q2 of FIGS. 6A and 6D are combined in order to show requantization which should be considered for a transcoder. FIG. 7B illustrates the quantization characteristics of the quantizers Q1 and Q2 under a usual state where a MPEG-1 quantization step size $\Delta$ is larger than a MPEG-4 quantization step size $\Delta'$. When an original DCT coefficient x is $[t_m, t_{m+1}]$, $y=r_m$ in FIG. 7B. When this value is input to the quantizer Q2, $r'_n$ is reconstructed as the value of x'. Here, as shown in FIG. 7B, there are three candidate values $r'_{n-1}, r'_n$ and $r'_{n+1}$ of a reconstruction level, which can be taken by the quantizer Q2. In other words, distortion can be reduced by the quantizer Q2 selecting an optimum reconstruction level.

As described above, due to the disagreement between the quantizers Q1 and Q2 in a dead zone and a quantization step size, the quantizer Q2 has a plurality of candidates of an amplitude level and needs to determine an optimum amplitude level among the candidates. An optimum amplitude level minimizes distortion and the number of generated bits. To determine such an optimum amplitude level, the present invention suggests an optimum amplitude level selection algorithm as follows.

Subscript values allowing a decision level to belong to a section $[t_m, t_{m+1}]$ in FIG. 7B are defined by a set P as shown below.

$$P=\{p|t'_p \in [t_{m+1},]\} \quad (15)$$

The candidates of the subscript values of the decision level are defined by a set K as follows.

$$K=P \cup \{\min\{P\}-1\} \quad (16)$$

where the symbol $\cup$ indicates a union, and an operator $\min\{A\}$ indicates a minimum value among the members of a set A.

Among the candidate subscript values, the members of the set K, a subscript value satisfying the following cost function is selected.

$$k = \arg\min_{k \in K} |C_m - r'_k| \text{ where } C_m = \frac{\int_{t_m}^{t_{m+1}} x \cdot p(x) dx}{\int_{t_m}^{t_{m+1}} p(x) dx} \quad (17)$$

A amplitude level $\lambda'$ corresponding to the subscript k determined in accordance with the cost function expressed by Equation (17) is variable length coded. A balance point $C_m$ in the cost function of Equation (17) is an optimum reconstruction level in a section $[t_m, t_{m+1}]$ used by a Lloyd-Max quantizer in view of mean square error. Accordingly, the balance point $C_m$ can be calculated from the distribution p(x) of x.

However, a transcoder cannot obtain the accurate statistical characteristic of the distribution p(x). To solve this problem, it is necessary to previously calculate the statistical characteristic of an original DCT coefficient when producing a MPEG-1 bitstream and transmit the information with the MPEG-1 bitstream to a transcoder. Alternatively, it is necessary to design a transcoder such that it can estimate the statistical characteristic of a distribution p(x). The former method is disadvantageous in increasing the number of overhead bits for additional information. The present invention uses the latter method.

It is generally known that AC DCT coefficients comply with the following Laplacian distribution.

$$p(x) = \frac{\lambda}{2} \cdot e^{-\lambda|x|} \quad (18)$$

Here, the statistical characteristic of a distribution p(x) is determined by the value of $\lambda$. In each block, different values of $\lambda$ are assigned to 63 AC coefficients.

When using Equation (18), an average of a random variable |x| can be given by Equation (19).

$$E(|x|) = \int_{-\infty}^{\infty} |x| \cdot p(x) dx = \int_{-\infty}^{\infty} |x| \cdot \frac{\lambda}{2} \cdot e^{-\lambda|x|} dx = \frac{1}{\lambda} \quad (19)$$

From Equation (19), $\lambda$ can be expressed by the following equation.

$$\lambda = \frac{1}{E(|x|)} \quad (20)$$

To verify Equation (20), $\lambda$ for a first frame of a flower garden sequence according to SIF standards was estimated using Equation (20), and the results are shown in Table 3.

TABLE 3

|   | 0 | 1 | 2 | 3 | 4 | 5 | 6 | 7 |
|---|---|---|---|---|---|---|---|---|
| 0 | — | 0.019 | 0.027 | 0.040 | 0.057 | 0.076 | 0.107 | 0.170 |
| 1 | 0.018 | 0.027 | 0.035 | 0.046 | 0.063 | 0.088 | 0.133 | 0.208 |
| 2 | 0.021 | 0.029 | 0.037 | 0.049 | 0.066 | 0.092 | 0.133 | 0.220 |
| 3 | 0.025 | 0.033 | 0.040 | 0.050 | 0.066 | 0.094 | 0.148 | 0.255 |
| 4 | 0.028 | 0.034 | 0.044 | 0.056 | 0.075 | 0.107 | 0.160 | 0.267 |
| 5 | 0.032 | 0.037 | 0.046 | 0.058 | 0.078 | 0.115 | 0.166 | 0.293 |
| 6 | 0.036 | 0.041 | 0.048 | 0.062 | 0.089 | 0.123 | 0.173 | 0.304 |
| 7 | 0.043 | 0.047 | 0.058 | 0.069 | 0.093 | 0.131 | 0.188 | 0.313 |

Figure 8A:
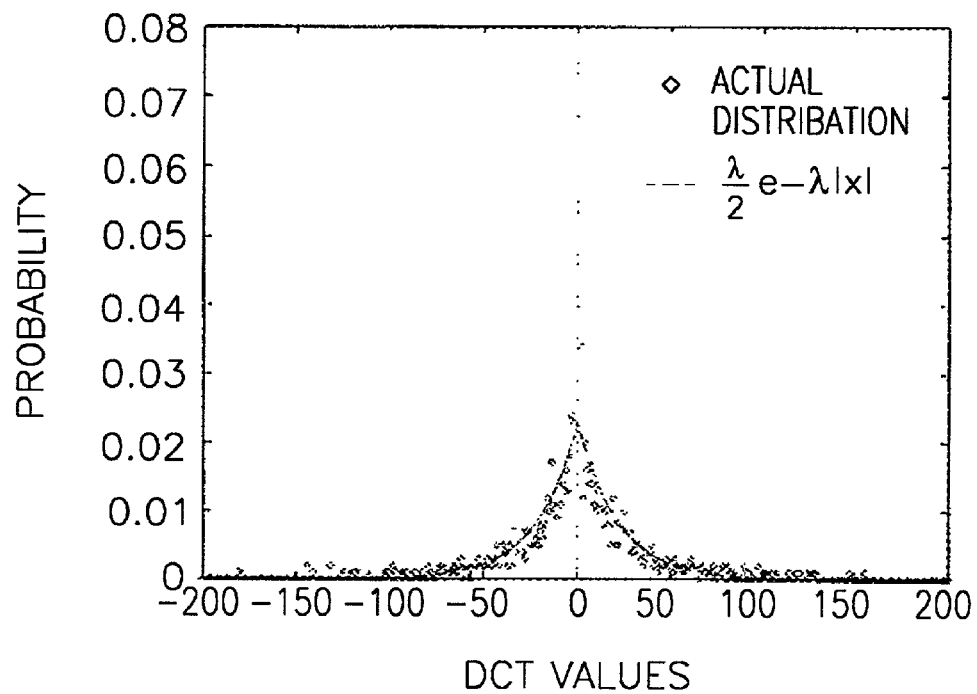
FIGS. 8A and 8B are graphs illustrating the effects of requantization according to the present invention.
Figure 8B:
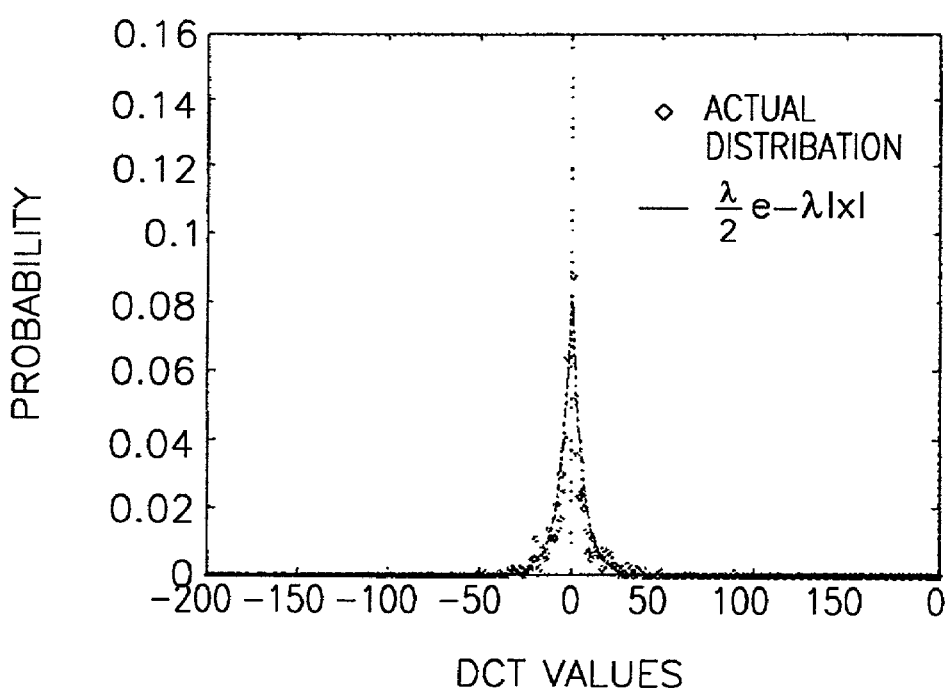

FIGS. 8A and 8B are graphs illustrating the accuracy in estimating the value of $\lambda$ according to the present invention. To confirm the results shown in Table 3, a Laplacian distribution when $\lambda=0.046$ is compared with an actual distribution for a coefficient (1, 3) in FIG. 8A, and a Laplacian distribution when $\lambda=0.166$ is compared with an actual distribution for a coefficient (5, 6) in FIG. 8B. It can be seen that the value of λ is smaller as an AC component becomes lower in frequency. This is because the probability that DCT coefficients having larger values exist at lower frequency is high due to the energy packing characteristics of DCT.

Although the value of λ can be calculated from Equation (19), the value of x cannot be obtained, but only the value of a reconstructed y can be obtained in a transcoder. Accordingly, it is necessary to approximate the value of E(|x|) according to Equation (21).

$$E(|x|) \cong E(|y|) + E(|z|)_{\frac{\Delta}{2}} \quad (21)$$

The second term in Equation (21) is added to compensate for an average of the values of |x|, which are reconstructed to be zero after quantization because they belong to a dead zone, and is defined as Equation (22).

$$E(|z|)_{\frac{\Delta}{2}} = \int_{-\frac{\Delta}{2}}^{\frac{\Delta}{2}} |z| \cdot p(z) dz \quad (22)$$

The value of p(z) necessary for calculating the second term in Equation (21) is given by Equation (23).

$$p(z) = \frac{\lambda'}{2} \cdot e^{-\lambda'|z|} \text{ where } \lambda' = \frac{1}{E(|y|)} \quad (23)$$

$$E(|z|)_{\frac{\Delta}{2}}$$

Equation (23) is calculated according to Equation (24).

$$E(|z|)_{\frac{\Delta}{2}} = 2 \cdot \int_{0}^{\frac{\Delta}{2}} z \cdot \frac{\lambda'}{2} \cdot e^{-\lambda'|z|} dz = \frac{1}{\lambda'} - e^{-\lambda'\Delta/2}\left(\frac{1}{\lambda'} + \frac{\Delta}{2}\right) \quad (24)$$

Accordingly, the value of λ estimated by a transcoder according to the present invention is expressed as follows.

$$\lambda = \frac{1}{E(|x|)} \cong \frac{1}{E(|y|) + E(|z|)_{\frac{\Delta}{2}}} = \frac{\lambda'}{2 - e^{-\lambda'\Delta/2}\left(1 + \frac{\Delta}{2}\lambda'\right)} \quad (25)$$

If a dead zone does not exist, Δ=0 in Equation (25) so that λ=λ'.

To verify the validity of Equation (25), a test was performed on a first flower garden image complying with the SIF standards. Table 4 shows the values of λ for each AC coefficient calculated using Equation (25). It can be seen that the calculated values of λ in the test are very similar to those shown in Table 3, with the exception that small errors occurs in values with respect to several high frequency components. However, these errors can be neglected.

TABLE 4

|   | 0 | 1 | 2 | 3 | 4 | 5 | 6 | 7 |
|---|---|---|---|---|---|---|---|---|
| 0 | — | 0.018 | 0.027 | 0.038 | 0.055 | 0.070 | 0.197 | 0.169 |
| 1 | 0.016 | 0.027 | 0.035 | 0.043 | 0.069 | 0.082 | 0.121 | 0.178 |
| 2 | 0.021 | 0.029 | 0.036 | 0.046 | 0.061 | 0.083 | 0.122 | 0.191 |
| 3 | 0.025 | 0.032 | 0.038 | 0.047 | 0.060 | 0.082 | 0.153 | 0.224 |
| 4 | 0.028 | 0.033 | 0.042 | 0.051 | 0.065 | 0.097 | 0.177 | 0.250 |
| 5 | 0.031 | 0.035 | 0.044 | 0.053 | 0.069 | 0.105 | 0.196 | 0.309 |
| 6 | 0.035 | 0.039 | 0.045 | 0.065 | 0.076 | 0.133 | 0.237 | 0.415 |
| 7 | 0.043 | 0.044 | 0.051 | 0.061 | 0.085 | 0.177 | 0.223 | 0.450 |

In the case where a MPEG-1 encoder employs a rate control scheme, a quantization parameter value is assigned an average of quantization parameters for an entire image to calculate Δ in Equation 6. It is necessary to estimate the value of λ to use Equation (17), and a delay by one frame occurs when the value of λ is calculated according to Equation (25).

Figure 9A:
FIGS. 9A through 9C illustrate an original image, an image corresponding to bitstreams transcoded according to a conventional method and an image corresponding to bitstreams transcoded according to the present invention, respectively.
Figure 9B:
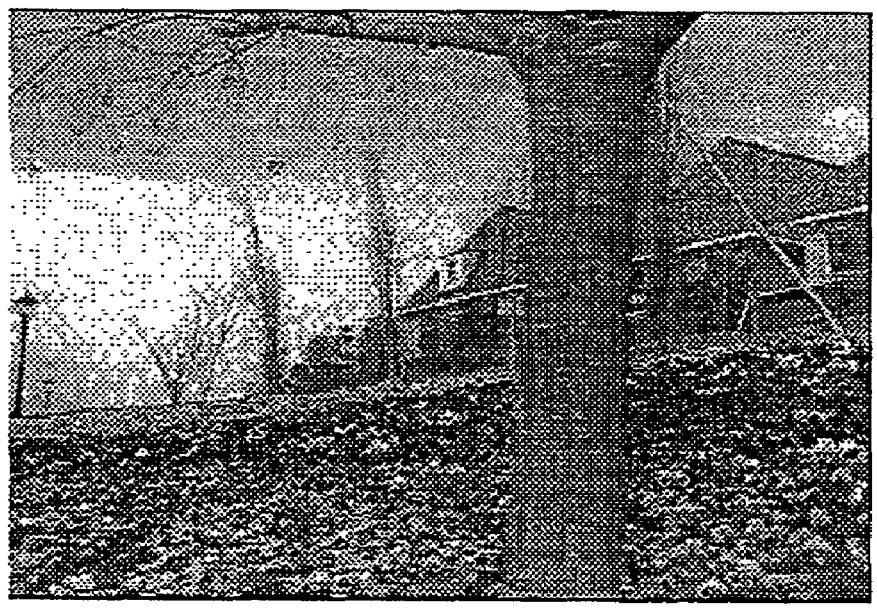
Figure 9C:
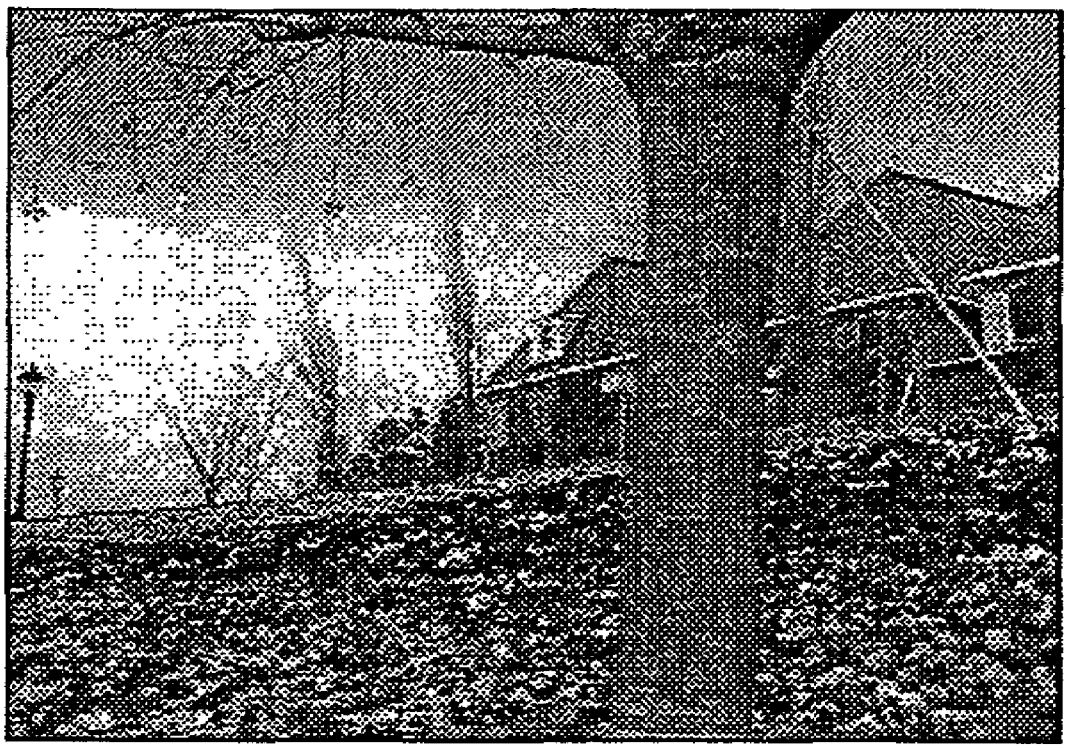

FIGS. 9A through 9C illustrate an original image, an image corresponding to bitstreams transcoded according to a conventional method and an image corresponding to bitstreams transcoded according to the present invention, respectively.

Figure 10:
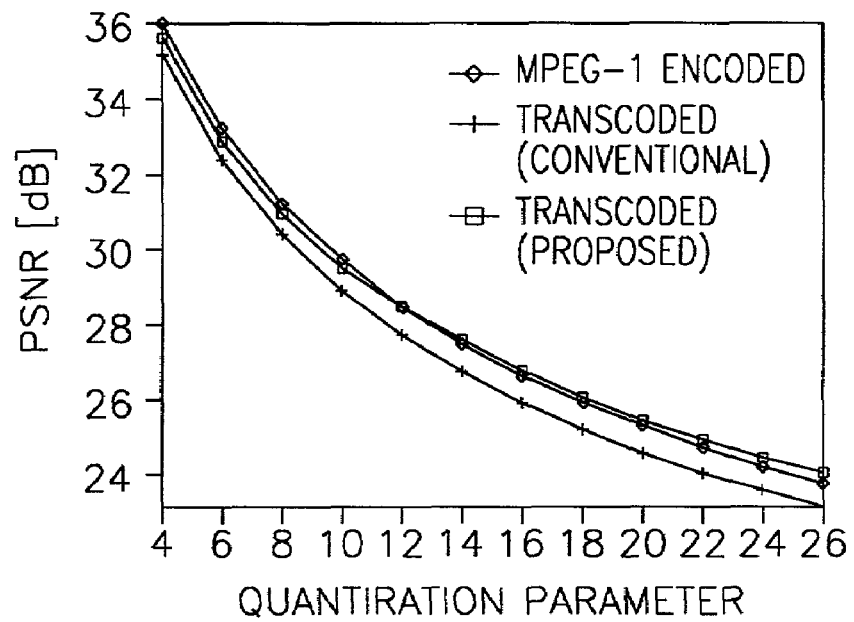
FIGS. 10 through 12 are graphs illustrating the results of testing a transcoding method according to the present invention.
Figure 11:
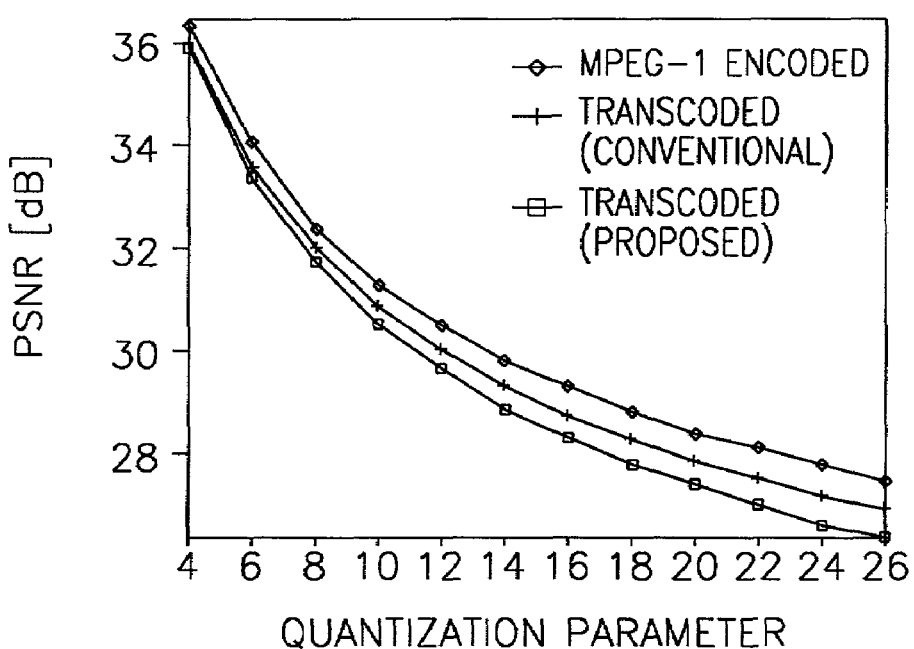
Figure 12:
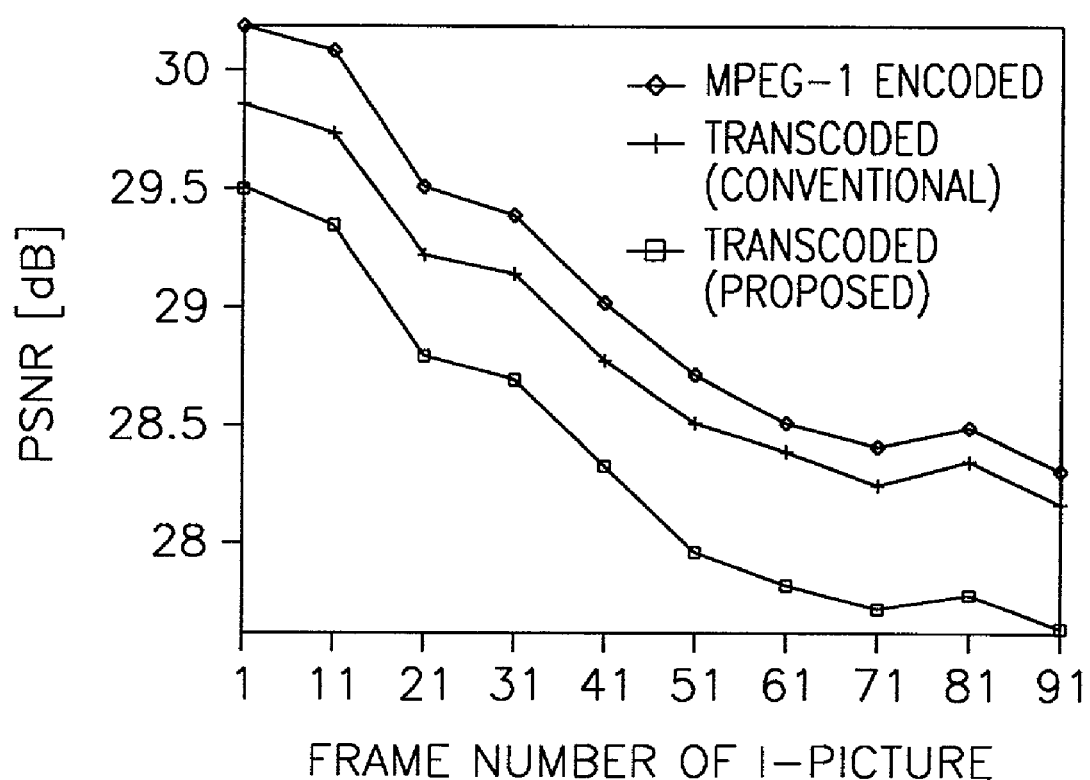

FIGS. 10 through 12 are graphs illustrating the results of testing a transcoding method according to the present invention. In a first test, simulation was performed on 10 flower garden sequences complying with the SIF standards. All frames were encoded in a MPEG-1 intra mode, and the same quantization parameter was applied throughout an image. FIG. 10 shows an average peak signal-to-noise ratio (PSNR) of a sequence which was transcoded by a method proposed depending on changes in the value of $Q_p$. For comparison, an average PSNR of an input MPEG-1 sequence and an average PSNR of a sequence which was transcoded by a conventional method are shown together. PSNR gain is about 0.3–0.6 dB. Table 5 shows average numbers of bits generated in the above three case.

TABLE 5

| Quantization parameters | MPEG-1 coded | Transcoded (conventional) | Transcoded (proposed) | Bit saving |
|---|---|---|---|---|
| 2 | 297509 | 304626 | 293659 | 10967 (3.60%) |
| 4 | 228122 | 241486 | 229292 | 10012 (4.14%) |
| 6 | 187950 | 204710 | 191378 | 13332 (6.51%) |
| 8 | 159041 | 177585 | 165223 | 12362 (6.96%) |
| 19 | 138606 | 158682 | 149244 | 9438 (5.94%) |
| 12 | 123148 | 144156 | 135114 | 9042 (6.27%) |
| 14 | 111746 | 133572 | 125123 | 8149 (6.10%) |
| 16 | 100669 | 123430 | 114320 | 9110 (7.38%) |
| 18 | 92440 | 116210 | 106748 | 9462 (8.14%) |
| 20 | 85294 | 109999 | 101935 | 8064 (7.33%) |
| 22 | 29598 | 105182 | 97548 | 7934 (7.52%) |
| 24 | 74153 | 100612 | 93008 | 7604 (7.55%) |

From Table 5, two interesting results can be inferred. One is that the number of bits generated in the proposed method is 3.6–7.5% smaller than that generated in the conventional method. This result can be explained based on the distribution of DCT coefficients. DCT coefficients are subject to a Laplacian distribution, in which a balance point $C_m$ having a positive value is on the left of the center between $t_m$ and $t_{m+1}$. Since $r_m$ is at the center between $t_m$ and $t_{m+1}$, $C_m$ is usually smaller than $r_m$. Accordingly, a probability that a smaller reconstruction level is selected increases. Since a small reconstruction level is used, the number of bits generated decreases.

The second interesting result is that the number of bits after transcoding is always larger than the number of input MPEG-1 bits. This is because for the same quantization parameter, a MPEG-4 quantization step size is always smaller than a MPEG-1 quantization step size. Accordingly, MPEG-4 uses a more accurate quantization step size, and as a result, the number of bits generated increases.

A second test was performed on table tennis test sequences under the same conditions as the first test. Like FIG. 10, average PSNRs are shown in FIG. 11. Gain according to the proposed present method is about 0.2–0.4 dB. In Table 6, the numbers of bits in the three cases as described in FIG. 10 are compared. It can be seen that about 5–7% of the bits conventionally used is saved.

TABLE 6

| Quantization parameters | MPEG-1 coded | Transcoded (conventional) | Transcoded (proposed) | Bit saving |
| --- | --- | --- | --- | --- |
| 4 | 172314 | 197318 | 186303 | 11015 (5.58%) |
| 6 | 124859 | 152412 | 143593 | 8819 (5.78%) |
| 8 | 98753 | 125954 | 118839 | 7115 (5.64%) |
| 19 | 80212 | 105236 | 97573 | 7663 (7.28%) |
| 12 | 67408 | 90390 | 84308 | 6082 (6.72%) |
| 14 | 58334 | 72344 | 67354 | 4990 (6.89%) |
| 16 | 52039 | 65004 | 61114 | 3850 (5.98%) |
| 18 | 45919 | 58261 | 54391 | 3870 (6.61%) |
| 20 | 51684 | 53324 | 49381 | 3943 (7.39%) |
| 22 | 38170 | 50124 | 46381 | 3743 (7.46%) |
| 24 | 35613 | 46312 | 42785 | 3527 (7.61%) |
| 26 | 33328 | 43981 | 40503 | 3478 (7.94%) |

A third test was performed on football sequences complying with the SIF standards. Each football sequence had a GOP whose size is 10 and was coded at a rate of 1.5 Mbps. FIG. 12 illustrates the PSNRs of 11th, 21st, 31st . . . frames which are I-pictures. It can be seen from FIG. 12 that the proposed method has gain of about 0.3–0.5 dB as compared to the conventional method. The number of bits generated according to the conventional method was 195805, and the number of bits generated according to the proposed method was 183731. Accordingly, about 6% of the bits was saved.

Figure 13:
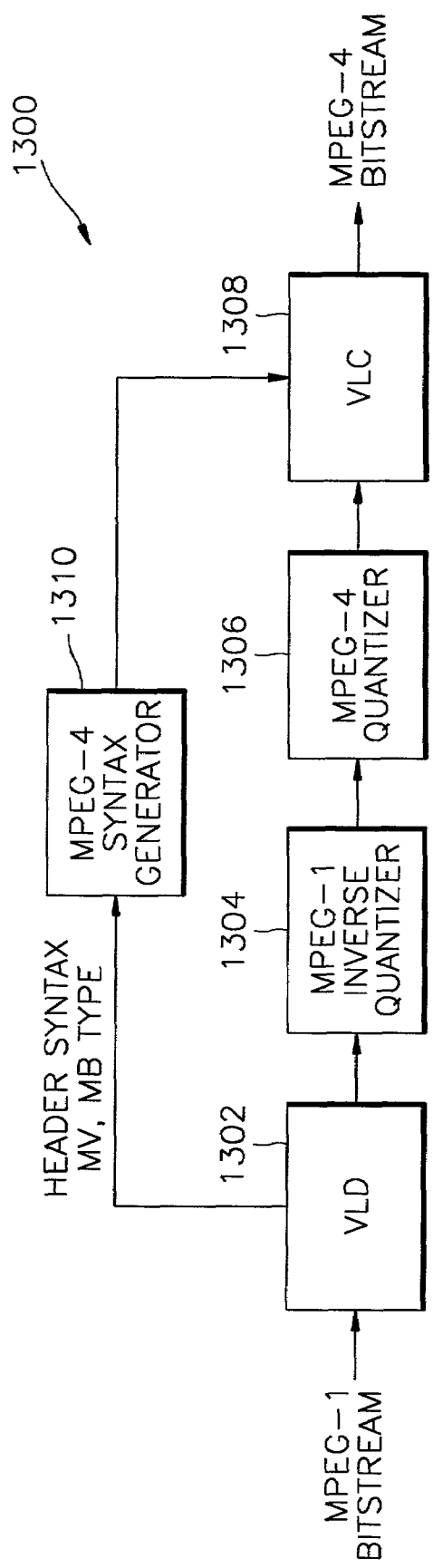
FIG. 13 is a block diagram illustrating a transcoding apparatus according to the present invention.

FIG. 13 is a block diagram illustrating a transcoding apparatus according to the present invention. Referring to FIG. 13, a transcoding apparatus 1300 performs transcoding according to the transcoding method described with reference to FIGS. 4 through 7B. Thus, the above contents described with reference to FIGS. 4 through 7B will be referred to for describing the detailed operations of members.

The transcoding apparatus 1300 includes a variable length decoder (VLD) 1302, a MPEG-1 inverse quantizer 1304, a MPEG-4 quantizer 1306, a variable length coder (VLC) 1308 and a MPEG-4 syntax generator 1310. The VLD 1302 reconstructs syntax elements and a quantized DCT coefficient from an input MPEG-1 bitstream and provides them to the MPEG-4 syntax generator 1310 and the MPEG-1 inverse quantizer 1304. The MPEG-1 inverse quantizer 1304 inverse-quantizes the quantized DCT coefficient according to MPEG-1 to reconstruct a DCT coefficient and provides the reconstructed DCT coefficient to the MPEG-4 quantizer 1306. The MPEG-4 quantizer 1306 quantizes the reconstructed DCT coefficient according to MPEG-4 to obtain a quantized DCT coefficient and provides the quantized DCT coefficient to the VLC 1308. By controlling a quantization step in the MPEG-4 quantizer 1306, a bit rate can be changed.

Meanwhile, the MPEG-4 syntax generator 1310 maps the syntax elements provided from the VLD 1302 to syntax elements complying with MPEG-4 and provides the MPEG-4 syntax elements to the VLC 1308. The mapping operation of the MPEG-4 syntax generator 1310 has been described in detail with reference to FIG. 4 and Tables 1 and 2.

The VLC 1308 variable length codes the quantized DCT coefficient provided from the MPEG-4 quantizer 1306 and the syntax elements provided from the MPEG-4 syntax generator 1310 according to the MPEG-4 and outputs the result. A bitstream output from the VLC 1308 has been compressed according to the MPEG-4 and has a desired aspect ratio and bit rate.

A transcoding apparatus according to the present invention performs conversion between bitstream compressed according to different compression methods. In the above embodiments, a method and apparatus for converting a MPEG-1 bitstream into a MPEG-4 bitstream has been described, but it will be apparent that the present invention can be applied to the case of converting a MPEG-2 bitstream to a MPEG-4 bitstream and to conversion between bitstreams compressed according to the same method. In addition, the present invention can be applied to the case of converting a MPEG-4 bitstream to a MPEG-1 or MPEG-2 bitstream.

As described above, the present invention facilitates the conversion between bitstreams compressed according to different methods or the same method. Therefore, a transcoding method and apparatus according to the present invention allows existing digital video contents complying with MPEG-1 or MPEG-2 to be used in terminals designed to use MPEG-4 digital video contents such as Internet video, mobile video and smart media.

What is claimed is:

1. A transcoding method of performing conversion between compressed bitstreams having at least syntax elements and video elements corresponding to video data, the transcoding method comprising the steps of:

a) decoding a first bitstream compressed according to a first compression method and parsing syntax elements and video elements;

b) mapping the parsed syntax elements to syntax elements complying with a target second compression method;

c) partially reconstructing video data complying with the first compression method from the parsed video elements;

d) requantizing the video data reconstructed in the step c) according to the second compression method; and e) coding the mapped syntax elements and the requantized video data to obtain a bitstream complying with the second compression method, wherein the first compression method is a moving picture experts group (MPEG)-1 compression method, the second compression method is an MPEG-4 compression method, and the step b) comprises:

b-1) converting an MPEG-1 f_code into an MPEG-4 f_code;

b-2) converting an MPEG-1 macroblock (MB) type into an MPEG-4 MB type;

b-3) converting an MPEG-1 coded block pattern (CBP) into an MPEG-4 CBP; and b-4) converting an MPEG-1 MQUANT value into an MPEG-4 DQUANT value corresponding to a difference of quantization parameters.

2. The transcoding method of claim 1, wherein the step b-1) performs the conversion according to the following equation, $$vop\_f\_code\_forward = \max((forward\_f\_code - 1), 1)$$

where max(a, b) is an operator of selecting a larger value between "a" and "b".

3. The transcoding method of claim 1, wherein the step b-2) comprises the steps of:
  (i) setting "nomc+coded" as an MPEG-4 "inter" type and setting a motion vector to (0, 0);
  (ii) setting "nomc+coded+q" as an MPEG-4 "inter+q" type and setting a motion vector to (0, 0);
  (iii) setting "mc+not coded" as an MPEG-4 "inter" type, using a motion vector as it is, and setting both "cbpy" and "cbpc" to zero; and
  (iv) setting the value of "code" determining "not coded" in MPEG-4 to 0 such as "cod=0" as many times as skipped MBs.

4. The transcoding method of claim 1, wherein the step b-3) comprises the steps of:
  b-3-1) individually coding cbpy according to the following equation, $cbpy=(cbp\&0x3c)>>2$ where "&" indicates an AND operation performed in bit unit, "0x3c" indicates "3c" of a hexadecimal number, and ">>n" indicates an n-bit right shift operation; and
  b-3-2) coding cbpc according to the following equation, $cbpc=(cbp\&0x03)>>2$, and
  the cbpc is united with the MB type obtained in the above step b-2) and coded to comply with an mcbpc VLC table of corresponding MPEG-4 I-VOP and P-VOP.

5. The transcoding method of claim 1, wherein the step b-4) performs the conversion according to the following equation, $d$quant=min (max((mquant of current MB−mquant of previous MB), -2),2).

6. The transcoding method of claim 1, wherein the step d) comprises the steps of:
  estimating a Laplacian distribution of a discrete cosine transform (DCT) coefficient reconstructed from an MPEG-1 bit stream;
  determining a reconstruction level using the estimated Laplacian distribution of the DCT coefficient; and
  performing quantization according to MPEG-4 using the determined reconstruction level.

7. The transcoding method of claim 1, wherein when an output y with respect to an input DCT coefficient x is expressed by $$y = Q_1(x) = \left\lfloor \left\lfloor \frac{x}{\Delta} + \frac{1}{2} \right\rfloor \cdot \Delta \right\rfloor,$$

a quantization step size $_i$ is given by $$\Delta i = \frac{Wi \cdot Q_p}{8}, i = 0, 1, 2 \cdots, 63$$

($Q_p$ is a quantization parameter), a decision level $t_m$ is given by $$t_m = \left(m - \frac{1}{2}\right) \cdot \Delta, m \geq 1,$$

$x_m = \{x|x\in[t_m, t_{m+1}]\}$ when x belongs to a section $[t_m, t_{m+1}]$, an amplitude level $\lambda_m$ of $x_m$ is expressed by $$\lambda_m = \left\lfloor \frac{x_m}{\Delta} + \frac{1}{2} \right\rfloor,$$

an output x' with respect to the input DCT coefficient y, which has been quantized by an MPEG-1 quantizer having a dead zone in which a reconstruction level for $x_m$, that is, an inverse-quantized DCT coefficient $r_m$ is given by $r_m = \lfloor \lambda_m \cdot \Delta \rfloor$, is expressed by $$x' = Q_2(y) = \begin{cases} \left\lfloor \left\lfloor \frac{y}{\Delta'} \right\rfloor \cdot \Delta' + \frac{\Delta'}{2} \right\rfloor & \text{if } Q_p \text{ is odd} \\ \left\lfloor \left\lfloor \frac{y}{\Delta'} \right\rfloor \cdot \Delta' + \frac{\Delta'}{2} \right\rfloor - 1 & \text{if } Q_p \text{ is even} \end{cases},$$

a quantization step size is given by $\Delta'=2Q_p$, a decision level $t'_n$ is given by $t'_n = n \cdot \Delta'$, $n \geq 1$, $y_n = \{y|y\in[t'_n, t'_{n+1}]\}$ when the output y belongs to a section $[t'_n, t'_{n+1}]$, and an amplitude level of $y_n$, that is, an inverse-quantized DCT coefficient $\lambda'_n$ is requantized by an MPEG-4 quantizer having a dead zone defined as $$\lambda'_n = \left\lfloor \frac{y_n}{\Delta'} \right\rfloor$$

and is converted into an MPEG-4 DCT coefficient, the step d) comprises the steps of:
  d-1) defining subscript values allowing the decision level to belong to a section $[t_m, t_{m+1}]$ as a set $P=\{p|t'_p \in [t_m, t_{m+1}]\}$;
  d-2) defining candidates of the subscript values of the decision level as a set $K=P\cup\{\min\{P\}-1\}$
  where the symbol ∪ indicates a union and an operator min {A} indicates a minimum value among the members of a set A; and
  d-3) selecting a member satisfying a cost function from among the candidate subscript values as a final subscript value, the cost function being expressed by $$k = arg \min_{k \in K} |C_m - r'_k| \text{ where } C_m = \frac{\int_{t_m}^{t_{m+1}} x \cdot p(x) dx}{\int_{t_m}^{t_{m+1}} p(x) dx}$$

where $C_m$ is an optimum reconstruction level in the section $[t_m, t_{m+1}]$ used by a Lloyd-Max quantizer in view of mean square error, and p(x) is a Laplacian distribution function.

8. The transcoding method of claim 7, wherein in the step d-3), $C_m$ is obtained by analyzing the statistical characteristic of p(x).

9. The transcoding method of claim 8, wherein when it is assumed that AC DCT coefficients comply with a Laplacian distribution expressed by $$p(x) = \frac{\lambda}{2} \cdot e^{-\lambda |x|},$$

a step of determining the value of λ determining the statistical characteristic of p(x) comprises the steps of:

d-3-1) calculating an average of a random variable |x| according to $$E(|x|) = \int_{-\infty}^{\infty} |x| \cdot p(x)\,dx = \int_{-\infty}^{\infty} |x| \cdot \frac{\lambda}{2} \cdot e^{-\lambda |x|}\,dx = \frac{1}{\lambda};$$

and d-3-2) determining λ according to $$\lambda = \frac{1}{E(|x|)}.$$

10. The transcoding method of claim 9, wherein the step d-3-2) comprises the steps of:

d-3-2-1) approximating the value of $E(|x|)$ according to $$E(|x|) \cong E(|y|) + E(|z|)_{\frac{\Delta}{2}}$$

where $$E(|z|)_{\frac{\Delta}{2}} = \int_{\frac{\lambda}{2}}^{\frac{\lambda}{2}} |z| \cdot p(z)dz, \text{ and } p(z) = \frac{\lambda'}{2} \cdot e^{-\lambda'|z|} \text{ where } \lambda' = \frac{1}{E(|y|)};$$

d-3-2-2) calculating $$E(|z|)_{\frac{\Delta}{2}}$$

according to $$E(|z|)_{\frac{\Delta}{2}} = 2 \cdot \int_0^{\frac{\Delta}{2}} z \cdot \frac{\lambda'}{2} \cdot e^{-\lambda'z}\,dz = \frac{1}{\lambda'} - e^{-\lambda'\Delta/2}\left(\frac{1}{\lambda'} + \frac{\Delta}{2}\right);$$

and d-3-2-3) estimating the value of λ according to $$\lambda = \frac{1}{E(|x|)} \cong \frac{1}{E(|y|) + E(|z|)_{\frac{\Delta}{2}}} = \frac{\lambda'}{2 - e^{-\lambda'\Delta/2}\left(1 + \frac{\Delta}{2}\lambda'\right)}.$$

11. A requantizing method in which an output y with respect to an input DCT coefficient x is expressed by $$y = Q_1(x) = \left\lfloor \left\lfloor \frac{x}{\Delta} + \frac{1}{2} \right\rfloor \cdot \Delta \right\rfloor,$$

a quantization step size $\Delta_i$ is given by $$\Delta_i = \frac{W_i \cdot Q_p}{8},\ i = 0, 1, 2 \cdots, 63$$

($Q_p$ is a quantization parameter), a decision level $t_m$ is given by $$t_m = \left(m - \frac{1}{2}\right) \cdot \Delta,\ m \geq 1,$$

$x_m = \{x | x \in [t_m, t_{m+1}]\}$ when x belongs to a section $[t_m, t_{m+1}]$, an amplitude level $\lambda_m$ of $x_m$ is expressed by $$\lambda_m = \left\lfloor \frac{x_m}{\Delta} + \frac{1}{2} \right\rfloor,$$

an output x' with respect to the input DCT coefficient y, which has been quantized by a MPEG-1 quantizer having a dead zone in which a reconstruction level for $x_m$, that is, an inverse-quantized DCT coefficient $r_m$ is given by $r_m = \lfloor \lambda_m \cdot \Delta \rfloor$, is expressed by $$x' = Q_2(y) = \begin{cases} \left\lfloor \left\lfloor \frac{y}{\Delta'} \right\rfloor \cdot \Delta' + \frac{\Delta'}{2} \right\rfloor & \text{if } Q_p \text{ is odd} \\ \left\lfloor \left\lfloor \frac{y}{\Delta'} \right\rfloor \cdot \Delta' + \frac{\Delta'}{2} \right\rfloor - 1 & \text{if } Q_p \text{ is even} \end{cases},$$

a quantization step size $\Delta'$ is given by $\Delta' = 2Q_p$, a decision level $t'_n$ is given by $t'_n = n \cdot \Delta'$, $n \geq 1$, $y_n = \{y | y \in [t'_n, t'_{n+1}]\}$ when the output y belongs to a section $[t'_n, t'_{n+1}]$, and an amplitude level of $y_n$, that is, an inverse-quantized DCT coefficient $\lambda'_n$ is requantized by a MPEG-4 quantizer having a dead zone defined as $$\lambda'_n = \left\lfloor \frac{y_n}{\Delta'} \right\rfloor$$

and is converted into a MPEG4 DCT coefficient, the requantizing method comprising the steps of:

d-1) defining subscript values allowing the decision level to belong to a section $[t_m, t_{m+1}]$ as a set $P = \{p | t'_p \in [t_m, t_{m+1}]\}$;

d-2) defining candidates of the subscript values of the decision level as a set $K = P \cup \{\min\{P\} - 1\}$ where the symbol $\cup$ indicates a union and an operator $\min\{A\}$ indicates a minimum value among the members of a set A; and d-3) selecting a member satisfying a cost function from among the candidate subscript values as a final subscript value, the cost function being expressed by $$k = \arg\min_{k \in K} |C_m - r'_k| \text{ where } C_m = \frac{\int_{t_m}^{t_{m+1}} x \cdot p(x)\,dx}{\int_{t_m}^{t_{m+1}} p(x)\,dx}$$

where $C_m$ is an optimum reconstruction level in the section $[t_m, t_{m+1}]$ used by a Lloyd-Max quantizer in view of mean square error, and p(x) is a Laplacian distribution function.

12. The requantizing method of claim 11, wherein in the step d-3), the balance point $C_m$ is obtained by analyzing the statistical characteristic of p(x).

13. The requantizing method of claim 12, wherein when it is assumed that AC DCT coefficients comply with a Laplacian distribution expressed by $$p(x) = \frac{\lambda}{2} \cdot e^{-\lambda|x|},$$

a step of determining the value of □ determining the statistical characteristic of p(x) comprises the steps of:

d-3-1) calculating an average of a random variable |x| according to $$E(|x|) = \int_{-\infty}^{\infty} |x| \cdot p(x)dx = \int_{-\infty}^{\infty} |x| \cdot \frac{\lambda}{2} \cdot e^{-\lambda|x|} dx = \frac{1}{\lambda};$$

and d-3-2) determining λ according to $$\lambda = \frac{1}{E(|x|)}.$$

14. The transcoding method of claim 13, wherein the step d-3-2) comprises the steps of:

d-3-2-1) approximating the value of E(|x|) according to $$E(|x|) \cong E(|y|) + E(|z|)_{\frac{\Delta}{2}}$$

where $$E(|z|)_{\frac{\Delta}{2}} = \int_{\frac{\lambda}{2}}^{\frac{\lambda}{2}} |z| \cdot p(z)dz, \text{ and } p(z) = \frac{\lambda'}{2} \cdot e^{-\lambda'|z|} \text{ where } \lambda' = \frac{1}{E(|y|)};$$

d-3-2-2) calculating $$E(|z|)_{\frac{\Delta}{2}}$$

according to $$(E(|z|))_{\frac{\Delta}{2}} = 2 \cdot \int_0^{\frac{\lambda}{2}} z \cdot \frac{\lambda'}{2} \cdot e^{-\lambda'|z|} dz = \frac{1}{\lambda'} - e^{-\lambda'\Delta/2}\left(\frac{1}{\lambda'} + \frac{\Delta}{2}\right);$$

and d-3-2-3) estimating the value of λ according to $$\lambda = \frac{1}{E(|x|)} \cong \frac{1}{E(|y|) + (E(|z|))_{\frac{\Delta}{2}}} = \frac{\lambda'}{2 - e^{-\lambda'\Delta/2}\left(1 + \frac{\Delta}{2}\lambda'\right)}.$$

15. A transcoding apparatus of performing conversion between compressed bitstreams having at least syntax elements and video elements corresponding to video data, the transcoding apparatus comprising:
   a decoder for reconstructing syntax elements and video elements from a first bitstream complying with a moving picture experts group (MPEG)-1 compression method;
   an inverse quantizer for inverse-quantizing the video elements provided from the decoder according to the moving picture experts group (MPEG)-1 compression method to reconstruct video data;
   a quantizer for requantizing the video data according to an MPEG-4 compression method;
   a syntax generator for mapping the syntax elements provided from the decoder to syntax elements complying with the MPEG-4 compression method; and
   an encoder for encoding the requantized video data provided from the quantizer and the syntax elements provided from the syntax generator according to the MPEG-4 compression method, thereby outputting a second bitstream,
   wherein the syntax generator converts an MPEG-1 f code into an MPEG-4 f code, converts an MPEG-1 macroblock (MB) type into an MPEG-4 MB type, converts an MPEG-1 coded block pattern (CBP) into an MPEG-4 CBP, and converts an MPEG-1 MQUANT value into an MPEG-4 DQUANT value corresponding to a difference of quantization parameters.

16. The transcoding apparatus of claim 15, wherein the first compression method is a moving picture experts group (MPEG)-1 compression method, the second compression method is an MPEG-4 compression method, and the syntax generator converts an MPEG-1 f_code into an MPEG-4 f_code, an MPEG-1 macroblock (MB) type into an MPEG-4 MB type; an MPEG-1 coded block pattern (CBP) into an MPEG-4 CBP; and an MPEG-1 MQUANT value into a MPEG-4 DQUANT value.

17. The transcoding apparatus of claim 16, wherein the syntax generator converts the MPEG-1 f_code into the MPEG-4 f_code according to the following equation, vop_f_code_forward=max((forward_f_code−1), 1)

where max(a, b) is an operator of selecting a larger value between "a" and "b".

18. The transcoding apparatus of claim 16, wherein the syntax generator converts the MPEG-1 macroblock (MB) type into the MPEG-4 MB type by:
   (i) setting "nomc+coded" as a MPEG-4 "inter" type and setting a motion vector to (0, 0);
   (ii) setting "nomc+coded+q" as a MPEG-4 "inter+q" type and setting a motion vector to (0, 0);
   (iii) setting "mc+not coded" as a MPEG-4 "inter" type, using a motion vector as it is, and setting both "cbpy" and "cbpc" to zero; and
   (iv) setting the value of "code" determining "not coded" in MPEG-4 to 0 such as "cod=0" as many times as skipped MBs.

19. The transcoding apparatus of claim 16, wherein the syntax generator converts the MPEG-1 coded block pattern (CBP) into the MPEG-4 CBP by individually coding cbpy according to the following equation, $$cbpy=(cbp\&0x3c)>>2$$

where "&" indicates an AND operation performed in bit unit, "0x3c" indicates "3c" of a hexadecimal number, and ">>n" indicates an n-bit right shift operation; and coding cbpc according to the following equation, $$cbpc=(cbp\&0x03)>>2,$$

and the cbpc is united with the MB type and coded to comply with an mcbpc VLC table of corresponding MPEG-4 I-VOP and P-VOP.

20. The transcoding apparatus of claim 16, wherein the syntax generator converts the MPEG-1 MQUANT value into the MPEG-4 DQUANT value according to the following equation, $$dquant=\min(\max((mquant\ of\ current\ MB-mquant\ of\ previous\ MB), -2), 2).$$

21. The transcoding apparatus of claim 16, wherein the quantizer requantizes the video data by estimating a Laplacian distribution of a discrete cosine transform (DCT) coefficient reconstructed from a MPEG-1 bit stream, determining a reconstruction level using the estimated Laplacian distribution of the DCT coefficient, and performing quantization according to MPEG-4 using the determined reconstruction level.

22. The transcoding apparatus of claim 16, wherein when an output y with respect to an input DCT coefficient x is expressed by $$y = Q_1(x) = \left\lfloor \left\lfloor \frac{x}{\Delta} + \frac{1}{2} \right\rfloor \cdot \Delta \right\rfloor,$$

a quantization step size $_i$ is given by $$\Delta i = \frac{Wi \cdot Q_p}{8}, i = 0, 1, 2 \ldots, 63$$

$Q_p$ is a quantization parameter), a decision level $t_m$ is given by $$t_m = \left(m - \frac{1}{2}\right) \cdot \Delta, m \geq 1,$$

$x_m=\{x|x\in[t_m,t_{m+1}]\}$ when x belongs to a section $[t_m, t_{m+1}]$, an amplitude level $\lambda_m$ of $x_m$ is expressed by $$\lambda_m = \left\lfloor \frac{x_m}{\Delta} + \frac{1}{2} \right\rfloor,$$

an output x' with respect to the input DCT coefficient y, which has been quantized by a MPEG-1 quantizer having a dead zone in which a reconstruction level for $x_m$, that is, an inverse-quantized DCT coefficient $r_m$ is given by $r_m=\lfloor\lambda_m\cdot\Delta\rfloor$, is expressed by $$x' = Q_2(y) = \begin{cases} \left\lfloor \left\lfloor \frac{y}{\Delta'} \right\rfloor \cdot \Delta' + \frac{\Delta'}{2} \right\rfloor & \text{if } Q_p \text{ is odd} \\ \left\lfloor \left\lfloor \frac{y}{\Delta'} \right\rfloor \cdot \Delta' + \frac{\Delta'}{2} \right\rfloor - 1 & \text{if } Q_p \text{ is even,} \end{cases}$$

a quantization step size is given by $\Delta'=2Q_p$, a decision level $t_{-n}$ is given by $t'_n=n\cdot\Delta'$, $n\geq 1$, $y_n=\{y|y\in[t'_n, t'_{n+1}]\}$ when the output y belongs to a section $[t_{-n}, t_{-n+1}]$, and an amplitude level of $y_n$, that is, an inverse-quantized DCT coefficient $\lambda'_n$ is requantized by the quantizer which has a dead zone defined as $$\lambda'_n = \left\lfloor \frac{y_n}{\Delta'} \right\rfloor$$

and is converted into a MPEG-4 DCT coefficient, the quantizer requantizes the video data by:

defining subscript values allowing the decision level to belong to a section $[t_m, t_{m+1}]$ as a set $P=\{p|t'_p\in[t_m,t_{m+1}]\}$;

defining candidates of the subscript values of the decision level as a set $K=P\cup\{\min\{P\}-1\}$ where the symbol $\cup$ indicates a union and an operator $\min\{A\}$ indicates a minimum value among the members of a set A; and selecting a member satisfying a cost function from among the candidate subscript values as a final subscript value, the cost function being expressed by $$k = \underset{k\in K}{\arg\min}|C_m - r'_k| \text{ where } C_m = \frac{\int_{t_m}^{t_{m+1}} x \cdot p(x) dx}{\int_{t_m}^{t_{m+1}} p(x) dx}$$

where $C_m$ is an optimum reconstruction level in the section $[t_m, t_{m+1}]$ used by a Lloyd-Max quantizer in view of mean square error, and p(x) is a Laplacian distribution function.

23. The transcoding apparatus of claim 22, wherein $C_m$ is obtained by analyzing the statistical characteristic of p(x).

24. The transcoding apparatus of claim 23, wherein when it is assumed that AC DCT coefficients comply with a Laplacian distribution expressed by $$p(x) = \frac{\lambda}{2} \cdot e^{-\lambda|x|},$$

the value of $\lambda$ determining the statistical characteristic of p(x) is determined by calculating an average of a random variable |x| according to $$E(|x|) = \int_{-\infty}^{\infty} |x| \cdot p(x) dx = \int_{-\infty}^{\infty} |x| \cdot \frac{\lambda}{2} \cdot e^{-\lambda|x|} dx = \frac{1}{\lambda},$$

and determining $\lambda$ according to $$\lambda = \frac{1}{E(|x|)}.$$

25. The transcoding method of claim 24, wherein determining $\lambda$ according to $$\lambda = \frac{1}{E(|x|)}$$

comprises:

approximating the value of $E(|x|)$ according to $$E(|x|) \cong E(|y|) + E(|z|)_{\frac{\Delta}{2}}$$

where $$E(|z|)_{\frac{\Delta}{2}} = \int_{-\frac{\Delta}{2}}^{\frac{\Delta}{2}} |z| \cdot p(z) dz, \text{ and } p(z) = \frac{\lambda'}{2} \cdot e^{-\lambda'|z|} \text{ where } \lambda' = \frac{1}{E(|y|)};$$

calculating $$E(|z|)_{\frac{\Delta}{2}}$$

according to $$E(|z|)_{\frac{\Delta}{2}} = 2 \cdot \int_0^{\frac{\lambda}{2}} z \cdot \frac{\lambda'}{2} \cdot e^{-\lambda'/z} dz = \frac{1}{\lambda'} - e^{-\lambda'\Delta/2}\left(\frac{1}{\lambda'} + \frac{\Delta}{2}\right);$$

and estimating the value of $\lambda$ according to $$\lambda = \frac{1}{E(|x|)} \cong \frac{1}{E(|y|) + E(|z|)_{\frac{\Delta}{2}}} = \frac{\lambda'}{2 - e^{-\lambda'\Delta/2}\left(1 + \frac{\Delta}{2}\lambda'\right)}.$$

* * * * *